United States Patent
Bhandarkar

(10) Patent No.: US 12,074,455 B2
(45) Date of Patent: Aug. 27, 2024

(54) OBJECT DETECTION IN WIRELESS CHARGING SYSTEMS AND RELATED SYSTEMS, METHODS, AND DEVICES

(71) Applicant: Microchip Technology Incorporated, Chandler, AZ (US)

(72) Inventor: Santosh Manjunath Bhandarkar, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/814,181

(22) Filed: Jul. 21, 2022

(65) Prior Publication Data

US 2023/0024604 A1 Jan. 26, 2023

Related U.S. Application Data

(60) Provisional application No. 63/203,413, filed on Jul. 21, 2021.

(51) Int. Cl.
*H02J 50/60* (2016.01)
*H02J 50/10* (2016.01)
*H02J 50/40* (2016.01)

(52) U.S. Cl.
CPC .............. *H02J 50/60* (2016.02); *H02J 50/10* (2016.02); *H02J 50/40* (2016.02)

(58) Field of Classification Search
CPC .. H02J 50/10; H02J 50/12; H02J 50/40; H02J 50/402; H02J 50/60; H02J 50/80
See application file for complete search history.

(56) References Cited

U.S. PATENT DOCUMENTS

| | | | | |
|---|---|---|---|---|
| 2012/0242285 A1* | 9/2012 | Jung | ................... | H02J 7/00309 320/108 |
| 2014/0239735 A1* | 8/2014 | Abe | ....................... | H02J 50/10 307/104 |
| 2015/0263532 A1* | 9/2015 | Van Wageningen | .... | H02J 50/80 307/104 |
| 2016/0149440 A1* | 5/2016 | Staring | .................... | G01V 3/10 307/104 |
| 2016/0218520 A1* | 7/2016 | Mehas | .................... | H02J 50/12 |

(Continued)

OTHER PUBLICATIONS

International Search Report for International Application No. PCT/US2022/074026, mailed Oct. 21, 2022, 5 pages.

(Continued)

*Primary Examiner* — Levi Gannon
(74) *Attorney, Agent, or Firm* — TraskBritt

(57) ABSTRACT

Foreign object detection for wireless power transmission and related systems, methods, and devices are disclosed. A controller for a wireless power transmitter is to determine a transmit coil voltage potential at a transmit coil of the wireless power transmitter, determine an input power provided to the wireless power transmitter, determine a transmitter power loss, and determine a transmitted power of the wireless power transmitted to the wireless power receiver based, at least in part, on the input power and the transmitter power loss. The controller is also to compute a power loss responsive to the transmitted power and a received power indicated by the wireless power receiver, and determine that a foreign object is detected responsive to a determination that the power loss is greater than a predetermined threshold.

16 Claims, 11 Drawing Sheets

(56) References Cited

U.S. PATENT DOCUMENTS

| | | | |
|---|---|---|---|
| 2017/0063165 A1 | 3/2017 | Baarman et al. | |
| 2018/0248408 A1* | 8/2018 | Chen | H02J 50/12 |
| 2019/0131826 A1* | 5/2019 | Park | H02J 50/80 |
| 2020/0169123 A1* | 5/2020 | Mehas | H02J 50/60 |
| 2020/0195051 A1* | 6/2020 | Smith | H02J 50/60 |
| 2021/0028653 A1 | 1/2021 | Park et al. | |
| 2021/0257863 A1* | 8/2021 | Sato | H02J 50/12 |
| 2021/0296941 A1* | 9/2021 | Shichino | H02J 50/80 |
| 2021/0305849 A1* | 9/2021 | Shimura | H02J 7/02 |
| 2022/0393516 A1* | 12/2022 | Shimura | H02J 50/60 |

OTHER PUBLICATIONS

Written Opinion of the International Searching Authority for International Application No. PCT/US2022/074026, mailed Oct. 21, 2022, 7 pages.

* cited by examiner

OBJECT DETECTION IN WIRELESS CHARGING SYSTEMS AND RELATED SYSTEMS, METHODS, AND DEVICES

CROSS-REFERENCE TO RELATED APPLICATION

This application claims the benefit under 35 U.S.C. § 119(e) of U.S. Provisional Patent Application Ser. No. 63/203,413, filed Jul. 21, 2021, entitled "OBJECT DETECTION IN WIRELESS CHARGING SYSTEMS AND RELATED SYSTEMS, METHODS, AND DEVICES," the disclosure of which is hereby incorporated herein in its entirety by this reference.

TECHNICAL FIELD

This disclosure relates generally to object detection in wireless charging systems, and more specifically to object detection in multi-coil wireless charging systems.

BACKGROUND

Wireless power transfer systems may transfer power from one electronic device to another electronic device. More specifically, a transmitter of a transmitting device may generate an electromagnetic field, and a receiver of a receiving device may extract power from the electromagnetic field. Foreign objects in proximity to a transmit coil may, however, draw power from the transmitter and may heat up, which not only reduces efficiency of power transfer, but may result in damage or fire.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1:
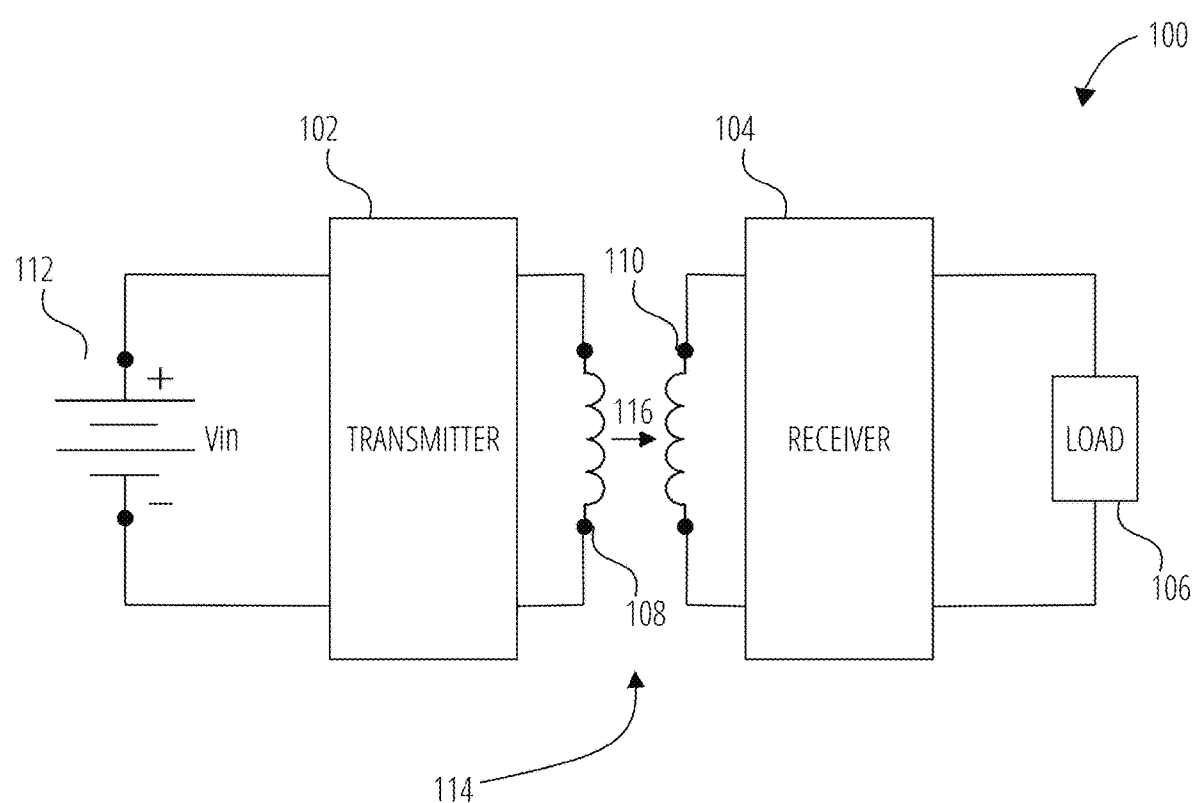
FIG. 1 is a block diagram of a wireless power system including a transmitter and a receiver, according to various examples.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples enabled herein may be utilized, and structural, material, and process changes may be made without departing from the scope.

The illustrations presented herein are not meant to be actual views of any particular method, system, device, or structure, but are merely idealized representations that are employed to describe the examples of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope is intended to encompass the examples and legal equivalents, the use of such terms is not intended to limit the scope of an example or this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code, without limitation) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Wireless power transfer techniques are used to transfer power from one system to another in a wide range of applications. Qi is a widely adopted wireless charging standard and it has proliferated into consumer cellular telephone brands.

By way of example, a Qi wireless system includes a transmitter and a receiver. The transmitter controls the power transferred to the receiver based on feedback received from the receiver. The transmitter includes at least one coil with which the receive coil is coupled in a wireless system. In a multi-coil transmitter design, there are multiple transmit coils overlapping each other so that the receive coil may be placed in proper alignment with any one of the transmit coils. This provides spatial freedom for receiver placement and ensures power transfer with a variety of placement positions of the receive coil proximate to the transmitter. In contrast, single coil transmitters require that the receive coil be properly aligned with the single transmit coil for power transfer.

One of the functions of the transmitter is to detect the presence of a receiver proximate to its coil. The Qi specification recommends using one of two methods for foreign object detection (FOD), namely quality factor (Q-factor) and power loss. The Qi power loss method uses a difference between the power transmitted by the transmitter and the power received by the receiver to compute the power loss. When a foreign object is present between the transmitter and receiver, the power loss numbers are higher than without the foreign object. The power loss difference may thus be used to detect the foreign object.

The Qi power loss method recommends using an electrical current sensor to measure the electrical current through the transmit coil and using the measured current through the transmit coil to estimate losses in the transmitter. The recommendations mention using coil current to estimate a transferred power that is transferred to the wireless power receiver at specific instants. At substantially the same instants a wireless power receiver measures the received power that was received at its receive coil and sends a communication indicating the measured value of the received power back to the wireless power transmitter. The wireless power transmitter determines a difference between the transmitted power and the received power to calculate the power loss. If the power lost exceeds a predetermined threshold value, the wireless power transmitter determines that a foreign object is in proximity to the transmit coil.

There are several losses in the transmitter from a power supply (e.g., a DC input to a power inverter such as an H-bridge inverter, without limitation) to the point where the coil current is measured. Metal-oxide-semiconductor field effect transistors (MOSFETs) of the H-bridge inverter, filter components, coil change switches for the transmit coils, and the transmit coils themselves have resistances associated therewith, which may cause power losses in these components. Further, the calculated power loss depends, at least in part, on several factors such as a transmitter-to-receiver coupling ratio, transmit coil and receive coil inductance, components used in the transmitter, and power measurement accuracy in the transmitter and the receiver, without limitations. As indicated above, foreign object detection may be helpful for wireless power systems as foreign objects may have a tendency to overheat if they absorb power from the transmitter, thereby leading to catastrophic failures and hazards.

Electrical current sensors used to measure a measurement voltage potential in a tank circuit of a wireless power transmitter may be relatively expensive as compared to solutions for sensing voltage potentials (which may be performed by voltage potential sampling, with an analog to digital converter of a microcontroller, without limitation) and may be susceptible to component failures due, at least in part, to vibration, e.g., if utilized in an automotive environment. Magnitudes of electrical currents in the tank circuit may be as large as ten times higher than a DC current provided from a power supply (e.g., due to exchange of reactive power between capacitive and inductive elements of the tank circuit, even while power is not delivered to a load). Current sensors (e.g., Hall effect sensors) that are sufficiently tolerant to these magnitudes of current present in the tank circuit are costly. Transformers may be used to step down the magnitude of the current to a level that is more reasonable, but the transformers themselves are costly and bulky. High side current sensing with low bias may also be used, but may also introduce additional cost. These current measurement device may introduce power losses, complication, and costs into a wireless power transmitter. As a result, various examples disclosed herein may relate to evaluating power loss under different conditions to detect foreign objects without a current sensor at the tank circuit.

Various examples disclosed herein include using a measurement voltage potential (e.g., indicative of a transmit coil voltage potential, a power filter voltage potential, or a tank circuit voltage potential, without limitation) rather than using a current measurement to detect foreign objects. In various examples a wireless power transmitter may include a power filter between a power inverter (e.g., an H-bridge inverter, without limitation) and transmit coils, and an output voltage potential of the power filter may be sampled to estimate the power loss. In various examples a wireless power transmitter may not include a power filter between the power inverter and the transmit coil, and a voltage potential at a junction of a tank circuit inductive-capacitive (LC) filter may be used to estimate the power loss. In either case, a measurement voltage potential is used (e.g., sampled, without limitations). In various examples the measurement voltage potential may be sampled in synchronization with provision of pulse-width modulation (PWM) signals, which may be provided to the power inverter (e.g., an H-bridge inverter). As a result, phase information may be available in addition to the measurement voltage potential.

Power loss estimation methods according to various examples disclosed herein may include a characterization phase and an operating phase. In the characterization phase the wireless power transmitter may be operated alone without a receive coil of a wireless power receiver in proximity to its transmit coil (e.g., no receiver on a surface of a charging pad, without limitation). Control variables (e.g., input voltage potential, frequency, phase shift, duty cycle, without limitation) may be varied from a minimum level to a maximum level incrementally. At each incremented level the input power into the power inverter may be measured along with a measurement voltage potential (e.g., a transmit coil voltage potential, a power filter output voltage potential, without limitation) for each transmit coil. Higher values of the input voltage potential and the duty cycle may correspond to a higher power loss in some instances. Data for a coil voltage potential versus input power may be obtained, and a characteristic curve (e.g., a second order characteristic curve, without limitation) may be fitted to the coil voltage potential versus input power data. Curve coefficients may be stored for each coil, which may be used to determine an input power level based, at least in part, on the measured voltage potential value. The input power computed at each level may symbolize the power lost in the non-ideal transmitter elements.

In an operating phase, with a receive coil of a wireless power receiver in proximity to the transmit coil (e.g., on a surface of a charging pad, without limitation), input power to the power inverter may be computed periodically (e.g., every millisecond, without limitation) responsive to a respective measurement voltage potential. A value of the input power may signify a total power consumed, which is the loss in the wireless power transmitter as well as the power supplied to the receive coil. In order to determine the power sent to receive coil, the transmitter losses are separated from total input power. The transmitter losses are computed from the characteristic curve based, at least in part, on the measurement voltage potential. The power supplied to the receive coil is measured at the wireless power receiver and communicated by the wireless power receiver to the wireless power transmitter. The measurement voltage potential is used to along with a characteristic curve relating the coil voltage potential to the input power to determine a transmitted power. Once the power supplied to the receive coil and the transmitted power are known at a given instant the power loss may be computed by subtracting the received power, an indication of which is received from the wireless power receiver, from the transmitted power. The computed power loss may be compared with a predetermined threshold value to determine whether a foreign object is present. If a foreign object is present the computed power loss may be larger than if no foreign object is present since the wireless power transmitter supplies power for its own loss, to the receiver, and to the foreign object. This leads to a larger power loss than if a foreign object were not present. Responsive to a determination that a foreign object is present the wireless power transmitter may stop supplying power to the wireless power receiver.

According to various examples disclosed herein, the presence of a foreign object may be detected based, at least in part, on a measurement voltage potential. Accordingly, foreign objects may be detected without the use of electrical current sensing circuitry, which may potentially be expensive, fragile, or both. Further, reliable detection of foreign objects proximate to a transmit coil of a wireless power transmitter with multiple receivers and varying load conditions may be accomplished, using low-cost components.

Examples disclosed herein may overcome complexities faced by the wireless power industry. Different control variable points may depend, at least in part, on transmitter to receiver coupling, receiver load, receiver output voltage potential, without limitation. Also, examples disclosed herein may provide power loss estimates for any of multiple different wireless power receiver designs (e.g., substantially 165 different wireless power receiver designs, without limitation). A failure to determine accurate power loss may result in false trips (turning off of wireless power transmission to a receiver due to a false positive detection of a foreign object) or the wireless power transmitter may fail to stop providing power in the presence of a foreign object.

In various examples disclosed herein a method of detecting power loss may use a calibration mode to characterize the power loss in the transmitter under different rail voltages. During calibration, there may be no foreign objects in proximity to the transmit coils. The rail voltage is increased from a minimum operating voltage to a maximum operating voltage, e.g., 1-11V, and the filter voltage, input current, and rail voltages are measured at each increment. A filter voltage potential to power loss may be fitted to a curve to obtain a power loss value for a given filter voltage potential (e.g., using a second order polynomial equation, without limitation). This may be repeated for each transmit coil. A dynamic threshold is calculated for each transmit coil based, at least in part, on the power loss value at a fixed filter voltage point. During a power transfer state, the power loss in the transmitter may be estimated and subtracted from a tank circuit input power to arrive at the transmitted power. The difference between transmitted power and received power is compared with a dynamic threshold to determine whether a foreign object is in proximity to the transmit coils.

In various examples a controller for a wireless power transmitter includes an input terminal and a processing core. The input terminal receives a measurement voltage potential (e.g., proportional to a transmit coil voltage potential) responsive to transmission of wireless power to a wireless power receiver. The processing core determines a transmit coil voltage potential at a transmit coil of the wireless power transmitter responsive to the measurement voltage potential, determines an input power (e.g., by sensing a current using a resistor between a power supply and an inverter input terminal) provided by a voltage source to the wireless power transmitter, determines a transmitter power loss, and determines a transmitted power of the wireless power transmitted to the wireless power receiver based, at least in part, on the input power and the transmitter power loss. The processing core also computes a power loss responsive to the transmitted power and a received power indicated by the wireless power receiver and determine that a foreign object is detected responsive to a determination that the power loss is greater than a predetermined threshold.

In various examples a wireless power transmitter includes a tank circuit, a gain block electrically connected to the tank circuit, and a controller. The tank circuit includes a plurality of transmit coils electrically selectable responsive to coil select signals. The controller provides the coil select signals to select a transmit coil of the plurality of transmit coils and samples a measurement voltage potential provided by the gain block during transmission of wireless power to a wireless power receiver. The controller also determines a power loss based, at least in part, on samples of the measurement voltage potential, a received power indicated by the wireless power receiver, and polynomial coefficients from a calibration operation. The controller determines that a foreign object is detected responsive to a determination that the power loss is greater than a predetermined threshold.

In various examples a method of detecting an object includes determining an input power provided by a voltage source to a wireless power transmitter, determining a transmitter power loss responsive to a measurement voltage potential, and determining a transmitted power of the wireless power transmitted to a wireless power receiver based, at least in part, on the input power and the transmitter power loss. The method also includes determining a power loss responsive to the determined transmitted power and a received power indicated by the wireless power receiver, and determining that a foreign object is detected responsive to a determination that the determined power loss is greater than a predetermined threshold.

FIG. 1 is a block diagram of a wireless power system 100 including a transmitter 102 and a receiver 104 (respectively a "wireless power transmitter 102" and "wireless power receiver 104"), according to various examples. Transmitter 102 is operably coupled to a voltage source 112 (e.g., a direct current (DC) voltage source such as a battery, without limitation) that provides an input voltage potential Vin. The receiver 104 is coupled to a load 106. Wireless power system 100 further includes a plurality of transmit coils 108 (of which one is shown in FIG. 1) and a receive coil 110, which may be used to transfer wireless power 116 from transmitter 102 to receiver 104 (e.g., via inductive coupling, without limitation). When one or more transmit coils 108 are in proximity with receive coil 110 the transmit coils 108 and the receive coil 110 may be coupled coils 114 (e.g., at least one of the transmit coils 108 may be inductively coupled to the receive coil 110, without limitation) of a contactless power coupling device. No physical connection is required between the transmitter 102 and the receiver 104 to transfer wireless power 116 from the transmitter 102 to the receiver 104. Rather, the wireless power 116 is transferred using magnetic flux linkage. The transmitter 102 may control the wireless power 116 transferred by controlling a voltage potential amplitude, frequency, phase, or duty cycle of an electrical signal provided to the transmit coils 108.

Power transmission may be efficient when one of the transmit coils 108 is properly aligned with receive coil 110. The transmitter 102 uses one of the transmit coils 108 that has a strongest coupling with the receive coil 110 to transmit the wireless power 116 to the receiver 104. The transmitter 102 may detect the presence of the receive coil 110 or a conductive foreign object. Also, if the receive coil 110 is detected, the transmitter 102 may select one of the transmit coils 108 (e.g., the transmit coil with the strongest coupling to the receive coil 110, without limitation) to transmit the wireless power 116 to the receive coil 110.

Figure 2:
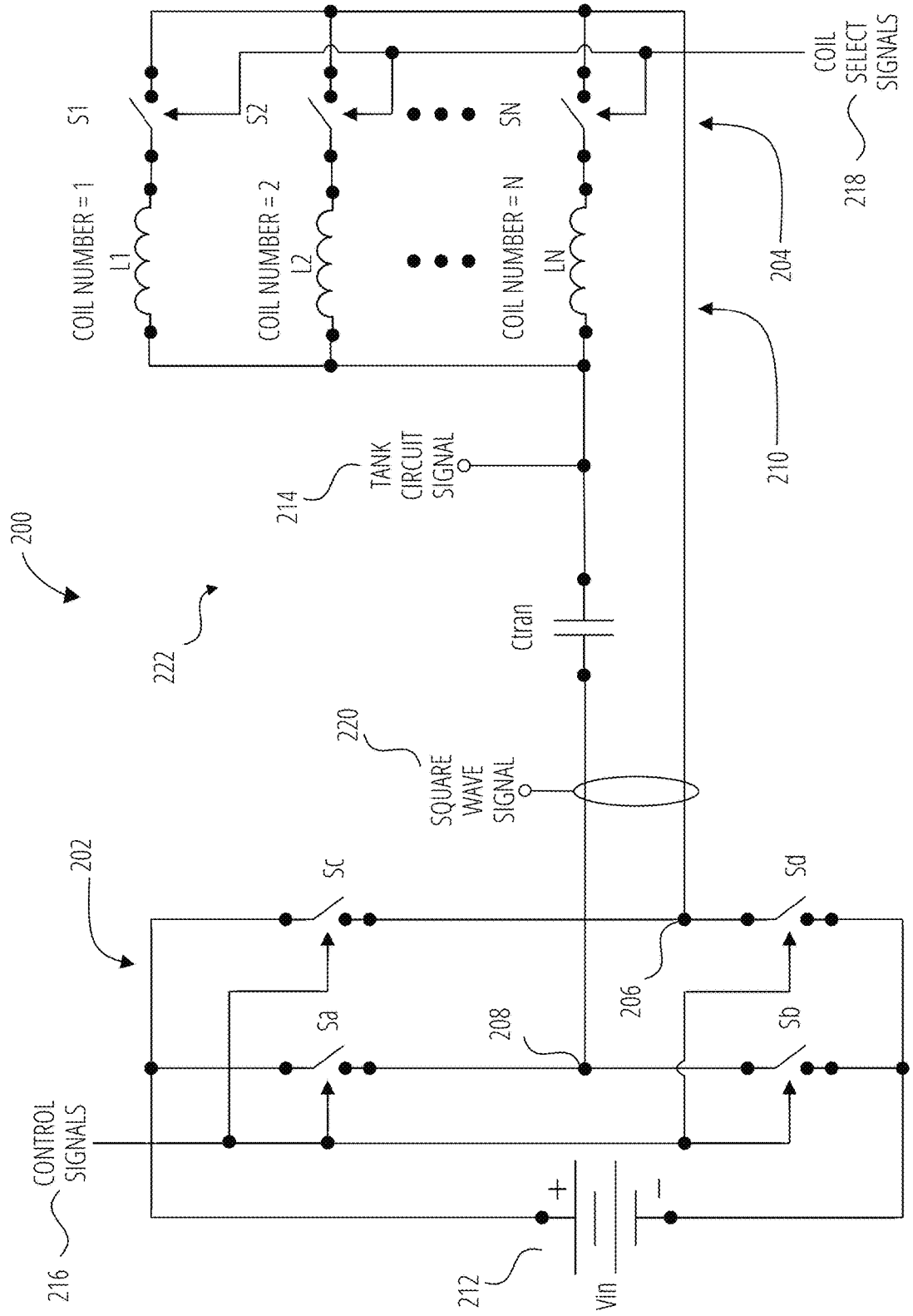
FIG. 2 is a circuit schematic illustration of a segment of a wireless power transmitter (e.g., the transmitter of FIG. 1), according to various examples.

FIG. 2 is a circuit schematic illustration of a segment 200 of a wireless power transmitter (e.g., the transmitter 102 of FIG. 1, without limitation), according to various examples. The segment 200 includes a voltage source 212 (an example of the voltage source 112 of FIG. 1), an H-bridge inverter 202, and a tank circuit 222.

Input terminals of the H-bridge inverter 202 are illustrated in FIG. 2 as being electrically connected to the voltage source 112. It should be noted, however, that in some examples the input of the H-bridge inverter 202 may instead be electrically connected to an output of a converter (not shown) (e.g., a DC to DC converter such as a four-switch buck boost converter (FSBBC), without limitation) that controls the input voltage potential Vin provided to the H-bridge inverter 202. The H-bridge inverter 202 includes four switches Sa, Sb, Sc, and Sd, as shown in FIG. 2. Switches Sa, Sb, Sc, and Sd are electrically controllable via control signals 216 from a controller (e.g., a microcontroller, without limitation) to generate a square wave signal 220 across a first node 208 and a second node 206 of the H-bridge inverter 202, which may be an AC signal.

By way of non-limiting example, the switches Sa, Sb, Sc, and Sd may be transistors having the control signals 216 provided to their gates. In some examples switches Sa, Sb, Sc, and Sd may be metal-oxide-semiconductor field effect transistors (MOSFETs) driven by MOSFET drivers, but may also be silicon carbide (SiC) MOSFETS or insulated-gate bipolar transistors (IGBTs). A controller may disable, or turn off, the square wave signal 220 by de-asserting the control signals 216 at each of the switches Sa, Sb, Sc, and Sd (i.e., providing a voltage potential selected to open the switch). With the control signals 216 de-asserted the first node 208 and the second node 206 may be in an electrically floating state. A controller (not shown in in FIG. 2) may activate the square wave signal 220 by alternating between: closing switches Sa and Sd while opening switches Sc and Sb; and opening switches Sa and Sd while closing switches Sc and Sb. Switches Sa, Sb, Sc, and Sd may be closed by asserting respective ones of the control signals 216. The control signals 216 provided by a controller may include a bus of signals to control the switches Sa, Sb, Sc, and Sd. In various examples a single signal of the control signals 216 may control switches Sa and Sd and another signal may control switches Sc and Sb. In various examples the control signals 216 may include four separate signals to control the switches Sa, Sb, Sc, and Sd separately. In various examples MOSFET driver inputs (not shown) of MOSFET drivers (not shown) electrically coupled between a controller and the switches Sa, Sb, Sc, and Sb are controlled by the control signals 216, which control signals 216 may be provided by pulse-width modulation (PWM) outputs from PWM output pins of the controller, without limitation. Some microcontrollers include PWM output pins to provide square wave signals at controllable duty cycles, which may be used in various examples as the control signals 216 to control the switches Sa, Sb, Sc, and Sd.

With switches Sa and Sd closed and switches Sb and Sc open the voltage potential across first node 208 and second node 206 may be substantially Vin, resulting in a positive half cycle of the square wave signal 220. With switches Sa and Sd open and switches Sb and Sc closed the voltage potential across first node 208 and second node 206 may be substantially −Vin, resulting in a negative half cycle of the square wave signal 220. Accordingly, with alternation between these two half cycles, the square wave signal 220 across first node 208 and second node 206 results. By way of non-limiting example, a frequency of operation (i.e., a switching frequency, which in turn amounts to a frequency of the square wave signal 220) may be set to substantially 120 kHz. The H-bridge inverter 202 applies the square wave signal 220 to the tank circuit 222.

The tank circuit 222 includes a capacitance of a transmit capacitor Ctran and an inductance of a selected one of the transmit coils 210 (e.g., the transmit coils 108 of FIG. 1, without limitation). The transmit coils 210 include transmit coils L1, L2, . . . , LN corresponding to coil numbers 1, 2, . . . , and N. The tank circuit 222 also includes coil switches 204 (coil switches S1, S2 . . . , SN), each electrically connected serially with a respective transmit coil L1, L2, . . . , LN. The number N of the transmit coils 210 and the coil switches 204 may be any number (e.g., two, three, four, five, ten, twenty, without limitation).

The coil switches 204 are electrically controllable to enable a controller to switchably couple the transmit coils 210 via coil select signals 218. By closing one of the coil switches 204 associated with one of the transmit coils 210, the associated one of the transmit coils 210 is effectively placed in the tank circuit 222. In some examples, only one of the transmit coils 210 is selected at a time (e.g., by closing the associated one of the coil switches 204, without limitation). In some examples the coil switches 204 may be transistors (e.g., back-to-back MOSFETs for conducting bidirectional AC current in the tank circuit 222, without limitation) having gates receiving the coil select signals 218. The coil select signals 218 provided by a controller may include a bus of signals to individually control respective coil switches 204. The square wave signal 220 from the H-bridge inverter 202 is applied across the tank circuit 222 via transmit capacitor Ctran.

A tank circuit signal 214 may be measured (e.g., by a controller, without limitation) during operation of the segment 200 to detect a presence of a foreign object in proximity to the transmit coils 210 during power transmission to a wireless power receiver (e.g., the receiver 104 of FIG. 1, without limitation), as is discussed in more detail below. The tank circuit signal 214 may also be used to detect the presence of a wireless power receiver, as is also discussed in more detail below.

Figure 3:
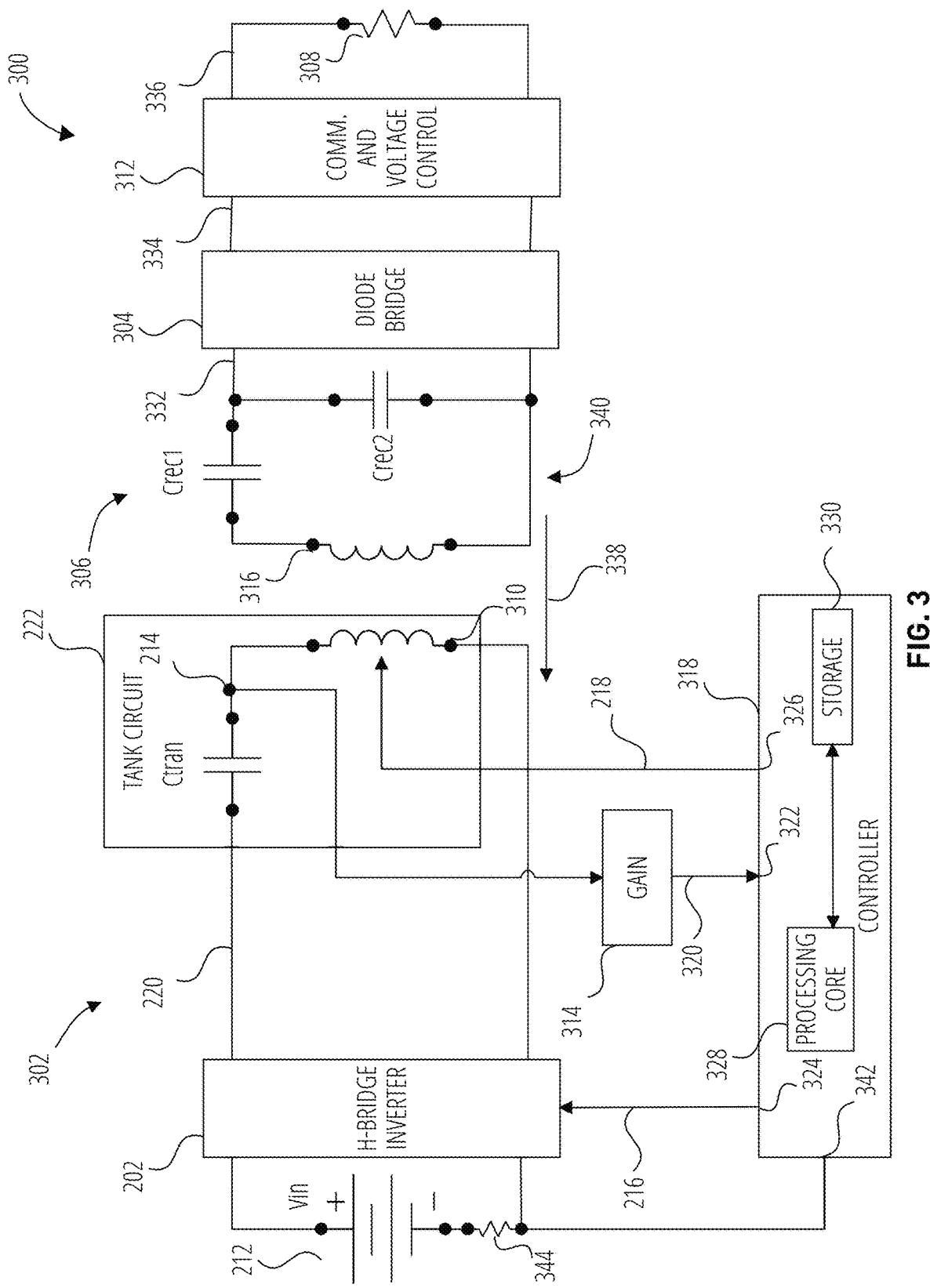
FIG. 3 is a circuit schematic illustration of an example of a wireless power system including the segment of FIG. 2.

FIG. 3 is a circuit schematic illustration of an example of a wireless power system 300 including the segment 200 of FIG. 2. The wireless power system 300 includes a transmitter 302 (an example of the transmitter 102 of FIG. 1) and a receiver 306 (an example of the receiver 104 of FIG. 1). The transmitter 302 includes a selected transmit coil 310 (e.g., a selected one of the transmit coils 210 of FIG. 2, selected using the coil select signals 218 of FIG. 2, without limitation), and a voltage source 212 (e.g., the voltage source 112 of FIG. 1, without limitation). The receiver 306 includes a receive coil 316 (e.g., the receive coil 110 of FIG. 1, without limitation) and a load 308 (e.g., the load 106 of FIG. 1, without limitation). As illustrated in FIG. 3, the transmitter 302 includes the H-bridge inverter 202 of FIG. 2, the tank circuit 222 of FIG. 2, and a controller 318. The transmitter 302 includes an input power resistor 344 electrically connected between a negative terminal of the voltage source 212 and a negative input terminal of the H-bridge inverter 202. The H-bridge inverter 202 is electrically connected between the voltage source 212 and the tank circuit 222. The tank circuit 222 includes the transmit capacitor Ctran of FIG. 2 electrically connected in series between the selected transmit coil 310 and the H-bridge inverter 202.

The controller 318 includes a processing core 328 electrically connected to one or more data storage devices (storage 330). The controller 318 also includes an input terminal 322 to receive a measurement voltage potential 320 responsive to the tank circuit signal 214 at the tank circuit 222 (e.g., taken at a junction between the transmit capacitor Ctran and the selected transmit coil 310, without limitation). By way of non-limiting example, the transmitter 302 may include a gain block 314 to receive the tank circuit signal 214 and provide the measurement voltage potential 320. Also by way of non-limiting example, in instances where the tank circuit signal 214 includes a tank circuit voltage potential the gain block 314 may include a voltage divider circuit and a unity gain operational amplifier buffer (not shown). In such examples the voltage divider circuit may include a pair of series connected resistors. The pair of series connected resistors is electrically connected between the node the tank circuit signal 214 is taken from (e.g., between the transmit capacitor Ctran and the selected transmit coil 310) and a reference voltage node such as a power supply node (e.g., Vss or ground, without limitation). The unity gain operational amplifier buffer includes an input terminal electrically connected to a node between the series connected resistors and an output terminal electrically connected to the input terminal 322. As another non-limiting example, the gain block 314 may include a resistor divider or an op-amp based gain circuit. Accordingly, the measurement voltage potential 320 may be indicative of the tank circuit signal 214, which is proportion to a coil voltage potential of the selected transmit coil 310, according to various examples. The controller 318 samples the measurement voltage potential 320 provided to the input terminal 322.

The controller 318 further includes a coil select output terminal 326 to provide one or more coil select signals 218 to the transmit coils (the transmit coils 210 of FIG. 2). The coil select signals 218 selectively control which of the transmit coils conducts the square wave signal 220 provided to the tank circuit 222. The controller 318 also includes an AC control output terminal 324 to provide control signals 216 to the H-bridge inverter 202. The control signals 216 control the square wave signal 220 applied to the tank circuit 222. For example, with the H-bridge inverter 202 electrically connected between the voltage source 212 and the tank circuit 222, the controller 318 may selectively apply the control signals 216 to convert the input voltage potential Vin (e.g., a DC voltage potential, without limitation) provided by the voltage source 212 to a square wave signal 220 (e.g., by periodically inverting the input voltage Vin, without limitation). Accordingly, the controller 318 may drive the H-bridge inverter 202 with PWM pulses at a fixed or variable frequency depending on a topology of the transmitter 302. The controller 318 includes an input power input terminal 342 electrically connected to the input power resistor 344 to enable the controller 318 to measure an input power provided by the voltage source 212 to the H-bridge inverter 202.

Operations performed by the processing core 328, which is a component of the controller 318, may be interchangeably described as being performed by the controller 318 herein. The processing core 328 of the controller 318 controls the coil select signals 218 to apply the square wave signal 220 to each selected transmit coil 310 one at a time. For example, the processing core 328 may control the H-bridge inverter 202 to apply the square wave signal 220 to the tank circuit 222 with each selected transmit coil 310 connected one at a time for a predetermined period of time (e.g., for a predetermined number of periods of the square wave signal 220, without limitation) such as eight to one hundred periods, corresponding to eight to one hundred pulses of the square wave signal 220. Following the application of the square wave signal 220 to the selected transmit coil 310, the processing core 328 may sample (e.g., at a very high sample rate such as 10 megahertz, without limitation) the measurement voltage potential 320. The measurement voltage potential 320 may be referenced to as a reference voltage potential (e.g., ground, or in other words, zero volts, without limitation) in one half cycle of a fundamental period of the square wave signal 220 when a bottom switch (Sd of FIG. 2) is closed. In the other half cycle the same voltage point may refer to a capacitor voltage potential since the switch Sb (FIG. 2) is closed.

In operation, transmitter 302 may transmit wireless power to the receiver 306. The processing core 328 may periodically perform a method (e.g., method 1300 of FIG. 13) of detecting a foreign object during transmission of wireless power to the receiver 306. At each instance of the method of detecting a foreign object the processing core 328 may determine a transmitted power that is transmitted to the receiver 306 (e.g., an input power at input terminals of the H-bridge inverter 202 less a determined power loss of the transmitter 302, without limitation). The receiver 306 may transmit a received power signal 338 indicating a received power that is detected at the receive coil 316 (e.g., periodically and synchronized with determinations, by the transmitter 302, of the transmitted power, without limitation) responsive to the wireless power received from the transmitter 302. The processing core 328 may compare the determined transmitted power to the received power indicated by the received power signal 338 to determine whether a foreign object is present.

The receiver 306 includes a resonant tank circuit 340 formed by the receive coil 316 and the receive capacitors Crec1 and Crec2 shown in FIG. 3. Accordingly, the receiver 306 may include receive capacitors Crec1 and Crec2, a diode bridge 304, and communication and voltage control circuitry 312. The receive capacitor Crec1 may be electrically connected in series between one end of the receive coil 316 and the diode bridge 304, and may have a larger capacitance value than that of Crec2. The receive capacitor Crec2 may be electrically coupled in parallel across input terminals of the diode bridge 304. The diode bridge 304 may rectify an AC received signal 332 received from the receive coil 316. Energy from the AC received signal 332 is provided by the diode bridge 304 as a DC power signal 334. Accordingly, the output of the resonant tank circuit 340 of the receiver 306 is passed through the diode bridge 304, which rectifies the DC power signal 334. The communication and voltage control circuitry 312 may receive the DC power signal 334 and produce a load voltage potential 336 to the load 308. By way of non-limiting example, the communication and voltage control circuitry 312 may include a buck converter or low-dropout regulator (LDO), which provides a fixed load voltage potential 336 at the load 308. The communication and voltage control circuitry 312 may be implemented in a controller (e.g., microcontroller, without limitation), without limitation.

Figure 4:
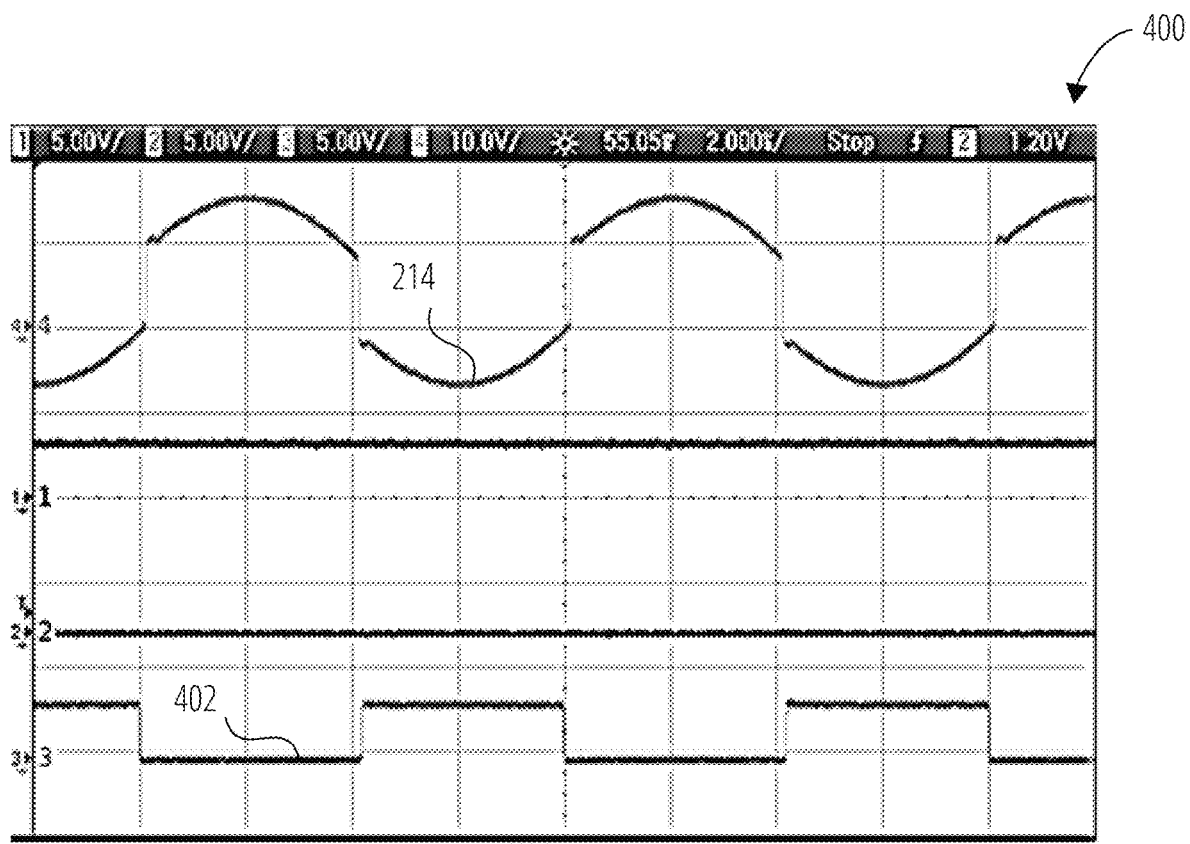
FIG. 4 is a plot illustrating examples of signals of the segment and transmitter of FIG. 2 and FIG. 3, respectively, with no load at a receiver.

FIG. 4 is a plot illustrating examples of signals 400 of the segment 200 and transmitter 302 of FIG. 2 and FIG. 3, respectively, with no load (e.g., without the load 308 of FIG. 3, without limitation) at a receiver 306. The signals 400 include an example of the tank circuit signal 214 of FIG. 2 and FIG. 3 and a control signal 402. The control signal 402 is an example of one of the control signals 216 of FIG. 2 and FIG. 3.

Figure 5:
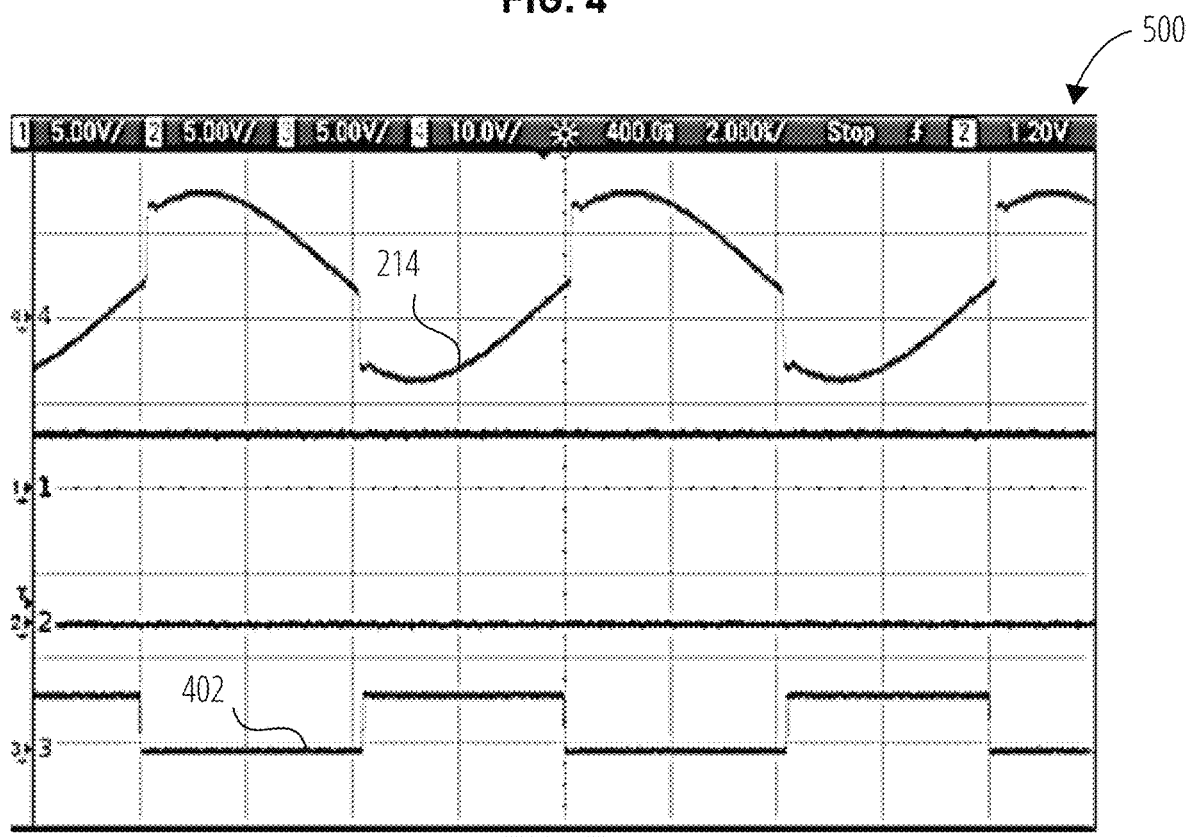
FIG. 5 is a plot illustrating examples of signals of the segment and transmitter of FIG. 2 and FIG. 3, respectively, with a full load at a receiver.

FIG. 5 is a plot illustrating examples of signals 500 of the segment 200 and transmitter 302 of FIG. 2 and FIG. 3, respectively, with a full load (e.g., the load 308 of FIG. 3, without limitation) at a receiver 306. The signals 500 include an example of the tank circuit signal 214 of FIG. 2 and FIG. 3 and the control signal 402 of FIG. 4, which is an example of one of the control signals 216 of FIG. 2 and FIG. 3.

Referring to FIG. 4 and FIG. 5 together, sampling (e.g., using an analog to digital controller (ADC), without limitation) of a measurement voltage potential 320 (FIG. 3) responsive to the tank circuit signal 214 may be performed synchronously with the control signal 402. There may be a small delay after the start to allow the power transients to settle down. In an oversampling/averaging mode the ADC may self-trigger at predetermined instants and take an average of the samples. In one example, the number of samples may be set at four with time delay between the samples set such that the last sample is taken around a quarter of a PWM period of the control signal 402.

As may be seen by observing the tank circuit signal 214 in FIG. 4 and FIG. 5, a shape of the tank circuit signal 214 is different in the no load scenario (FIG. 4) from a shape of the tank circuit signal 214 in the full load scenario (FIG. 5).

Figure 6:
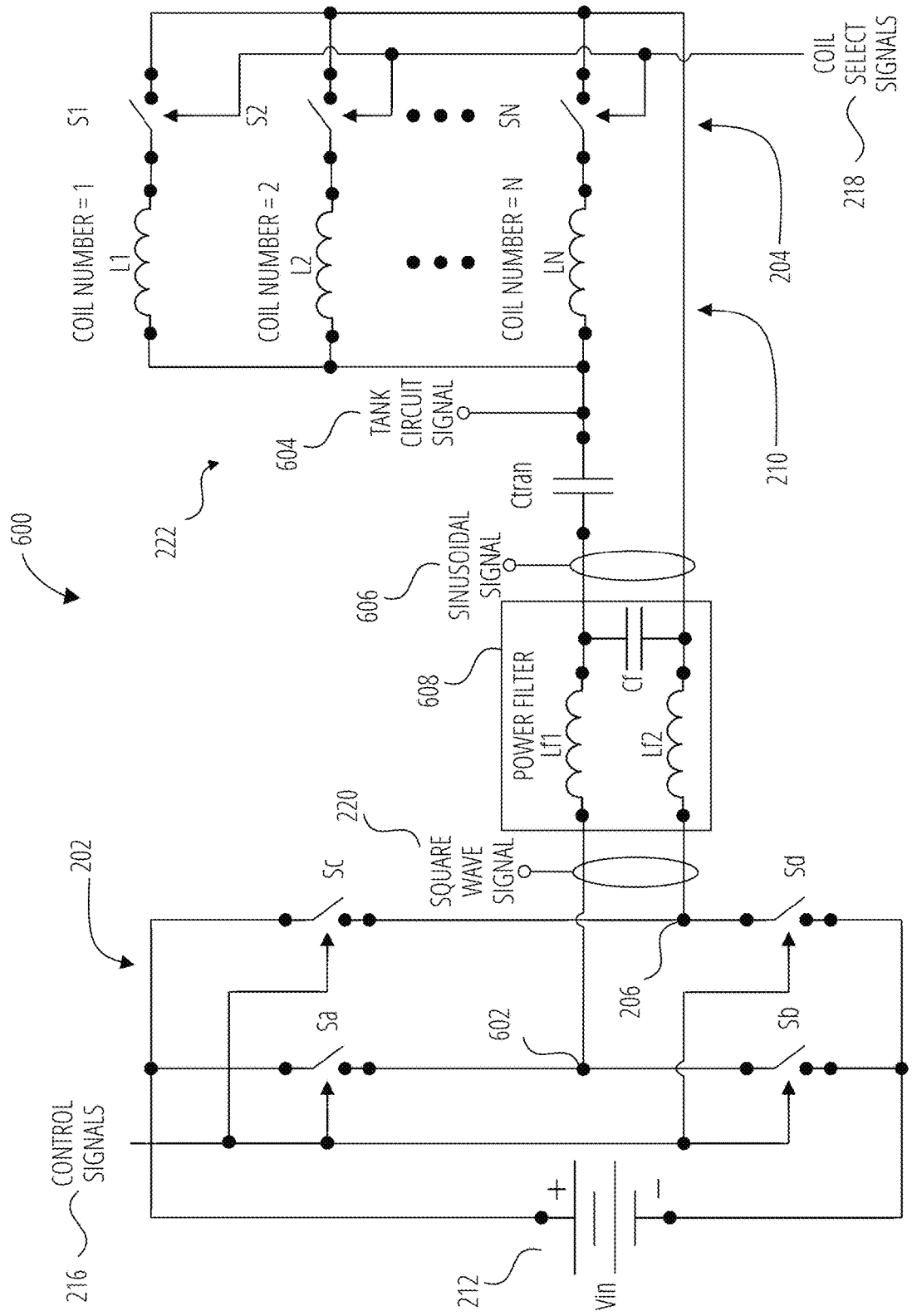
FIG. 6 is a circuit schematic illustration of another segment of a wireless power transmitter (e.g., the transmitter of FIG. 1, without limitation), according to various examples.

FIG. 6 is a circuit schematic illustration of another segment 600 of a wireless power transmitter (e.g., the transmitter 102 of FIG. 1, without limitation), according to various examples. The segment 600 includes the voltage source 212, the H-bridge inverter 202, and the tank circuit 222 discussed above with reference to FIG. 2. The segment 600 also includes a power filter 608 operably coupled between the H-bridge inverter 202 and the tank circuit 222.

The power filter 608 is a second order LC filter. A resonance frequency of the power filter 608 may be much higher than a resonance frequency of the tank circuit 222. The power filter 608 includes a first filter inductor LF1, having a first end electrically connected to the first node 602, which first node 602 may be at the same point in H-bridge inverter 202 as first node 208 of FIG. 2, and a second filter inductor Lf2, having a first end electrically connected to the second node 206. The power filter 608 also includes a filter capacitor Cf electrically connecting from the second end of first filter inductor Lf1 to the second end of the second filter inductor Lf2 on a tank circuit 222 side of the segment 600. The power filter 608 filters out high frequency components of the square wave signal 220. By way of non-limiting example, the power filter 608 filters out substantially all but a fundamental switching frequency of the control signals 216 to apply a sinusoidal signal 606 at substantially the fundamental frequency across the tank circuit 222 responsive to the square wave signal 220. Absent the power filter 608, the square wave signal 220 including the fundamental frequency and odd harmonics would be provided to the tank circuit 222. The power filter 608 may reduce high frequency electromagnetic radiation emitted from the transmitter.

A voltage potential at a cathode or an anode of the filter capacitor Cf, the tank circuit signal 604, or both may be measured (e.g., by a controller, without limitation) during operation of the segment 600 to detect a presence of a foreign object in proximity to the transmit coils 210 during wireless power transmission to a wireless power receiver, as is discussed in more detail below. The voltage potential at the cathode or the anode of the filter capacitor Cf, the tank circuit signal 604, or both may also be used to detect the presence of a wireless power receiver in proximity to the transmit coils 210.

Figure 7:
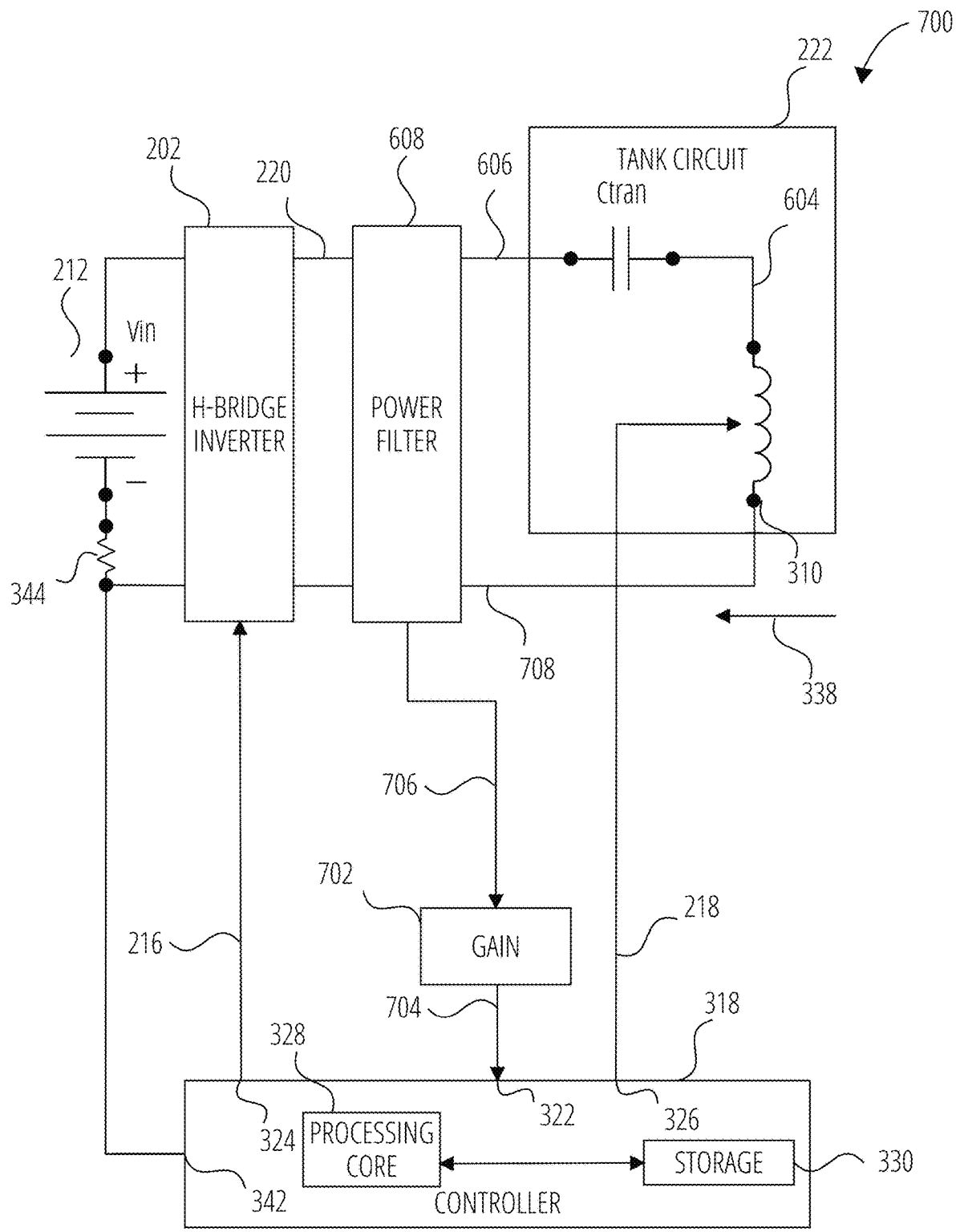
FIG. 7 is a circuit schematic illustration of an example of a transmitter including the segment of FIG. 6.

FIG. 7 is a circuit schematic illustration of an example of a transmitter 700 including the segment 600 of FIG. 6. The transmitter 700 may be an example of the transmitter 102 of FIG. 1. The transmitter 700 includes a selected transmit coil 310 (selected from the transmit coils 210 of FIG. 6, selected using the coil select signals 218 of FIG. 6), and the voltage source 212 of FIG. 6. As illustrated in FIG. 7, the transmitter 700 also includes the H-bridge inverter 202 and the tank circuit 222 of FIG. 6. The transmitter 700 also includes the controller 318 discussed above with reference to FIG. 3. In contrast to the transmitter 302 of FIG. 3, however, the transmitter 700 includes the power filter 608 of FIG. 6 electrically connected between the H-bridge inverter 202 and the tank circuit 222.

Also, in contrast to the gain block 314 of FIG. 3, which receives a tank circuit signal 214 from the junction between the transmit capacitor and the selected transmit coil 310, the transmitter 700 includes a gain block 702 that receives a power filter signal 706 from the power filter 608. By way of non-limiting example, the power filter signal 706 may be taken at a junction between the filter capacitor Cf and the transmit capacitor Ctran (FIG. 6), a complementary sinusoidal signal 708 taken from a different output terminal (at a junction between the second filter inductor LF2 and the filter capacitor Cf of FIG. 6) of the power filter 608, or a voltage potential difference taken across the output terminals of the power filter 608 (e.g., the sinusoidal signal 606 of FIG. 6, without limitation). The presence of the power filter 608 may result in a power filter signal 706 that is different from a transmit coil voltage potential.

Also by way of non-limiting example, a signal path for delivering the power filter signal 706 to the gain block 702 may include a diode to deliver only a positive portion of the power filter signal 706 to the gain block 702.

By way of non-limiting example, a resistor divider including a 20 kΩ resistor electrically connected to an output of the diode and a 6.19 kΩ resistor may be electrically connected from the 20 kΩ resistor to ground, and a node between the resistors may be sampled for the measurement voltage potential 704. The diode may be rated for at least 30 V, without limitation. As a result, the power filter signal 706 may be rectified by the diode and stepped down by the resistor divider of the gain block 702. The diode may block a negative portion of the power filter signal 706 and only a positive signal may be used for sampling. The resistor divider ratio may be less compared to a resistor divider ratio used for a differential amplifier.

As another non-limiting example, a voltage potential across the output terminals of the power filter 608 (i.e., across the filter capacitor Cf of FIG. 6) may be fed to a differential amplifier (not shown) with a bias (e.g., to center the measurement voltage potential within a detectable range for detection by the controller 318) so that both the positive and negative half signals are provided to the gain block 702. Power loss indexing may be performed by sampling the voltage potential difference across the filter capacitor Cf (FIG. 6). Power loss indexing may include estimating the power loss in the transmitter (e.g., Ptl in FIG. 13) based on the power loss curve illustrated in FIG. 12 (e.g., using coefficients of the curve). The voltage potential across the filter capacitor Cf may be passed through a differential amplifier and the output may be sampled (e.g., by an ADC, without limitation). In various non-limiting examples only a part (e.g., a quarter part such as a zero to ninety degree phase, without limitation) of the filter capacitor voltage potential is sampled, which may improve resolution of the signal provided for sampling.

The gain block 702 receives the power filter signal 706 and provides a measurement voltage potential 704 to the input terminal 322 (e.g., an analog to digital converter input, without limitation) of the controller 318 responsive to the power filter signal 706. The processing core 328 may control the H-bridge inverter 202 to apply the sinusoidal signal 606 to the tank circuit 222 with each of the selected transmit coil 310 connected one at a time for a predetermined period of time (e.g., for a predetermined number of periods of the sinusoidal signal 606 such as eight to one hundred periods, corresponding to eight to one hundred pulses of the square wave signal 220, without limitation). Following the application of the sinusoidal signal 606 to each selected transmit coil 310, the processing core 328 may sample (e.g., at a very high sample rate such as 10 megahertz, without limitation) the measurement voltage potential 704.

In operation, transmitter 700 may transmit wireless power to a receiver similar to the receiver 306 of FIG. 3. The processing core 328 may periodically perform a method (e.g., method 1300 of FIG. 13) of detecting a foreign object during transmission of wireless power to the receiver. At each instance of the method of detecting a foreign object the processing core 328 may determine, based at least in part on the measurement voltage potential 704, a transmitted power that is transmitted to the receiver (e.g., an input power at input terminals of the H-bridge inverter 202 less a determined power loss of the transmitter 700, without limitation). The receiver may transmit a received power signal 338 indicating a received power that is detected at its receive coil (e.g., periodically and synchronized with determinations, by the transmitter 700, of the transmitted power, without limitation) responsive to the wireless power received from the transmitter 700. The processing core 328 may compare the determined transmitted power to the received power indicated by the received power signal 338 to determine whether a foreign object is present.

Figure 8:
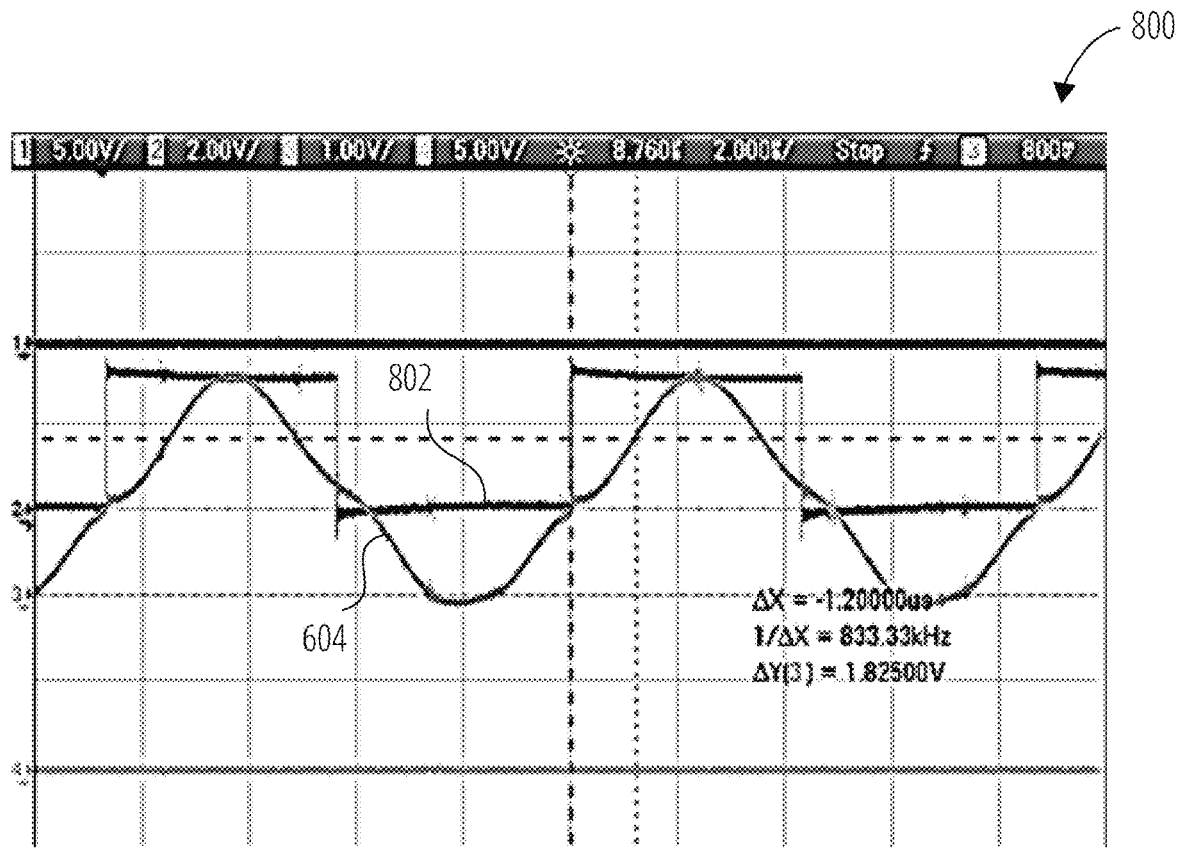
FIG. 8 is a plot illustrating examples of signals of the segment and transmitter of FIG. 2 and FIG. 3, respectively, with no load at a receiver.

FIG. 8 is a plot illustrating examples of signals 800 of the segment 600 and transmitter 700 of FIG. 6 and FIG. 7, respectively, with no load at a receiver. The signals 800 include an example of the tank circuit signal 604 of FIG. 6 and FIG. 7 and a control signal 802. The control signal 802 is an example of one of the control signals 216 of FIG. 6 and FIG. 7.

Figure 9:
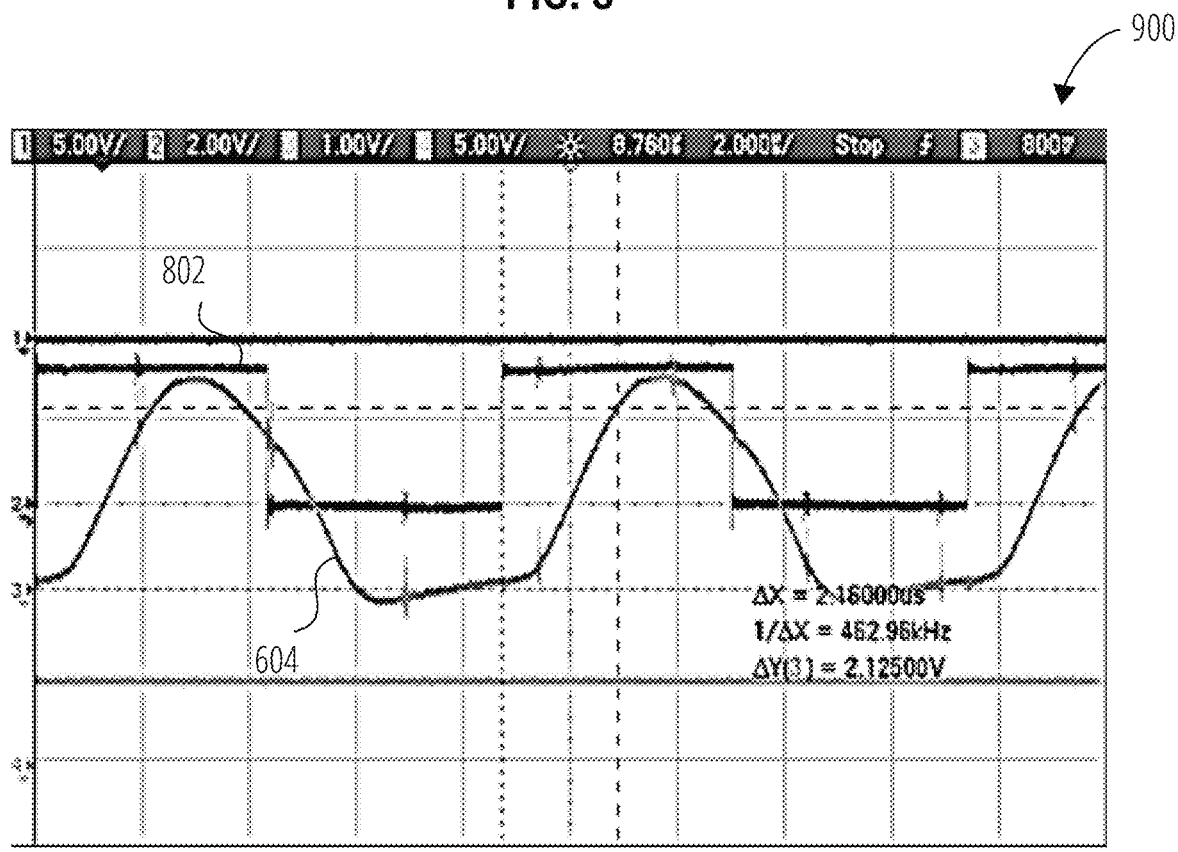
FIG. 9 is a plot illustrating examples of signals of the segment and transmitter of FIG. 6 and FIG. 7, respectively, with a full load at a receiver.

FIG. 9 is a plot illustrating examples of signals 900 of the segment 600 and transmitter 700 of FIG. 6 and FIG. 7, respectively, with a full load at a receiver. The signals 900 include an example of the tank circuit signal 604 of FIG. 6 and FIG. 7 and the control signal 802 of FIG. 8, which is an example of one of the control signals 216 of FIG. 6 and FIG. 7.

Referring to FIG. 8 and FIG. 9 together, sampling (e.g., using an ADC, without limitation) of a measurement voltage potential 704 (FIG. 7) responsive to the power filter signal 706 (FIG. 7) (which may correlate to the tank circuit signal 604) may be performed synchronously with the control signal 802. There may be a small delay after the start to allow the power transients to settle down. In an oversampling/averaging mode the ADC may self-trigger at predetermined instants and take an average of the samples. In one example, the number of samples may be set at four with time delay between the samples set such that the last sample is taken around a quarter of a PWM period of the control signal 802.

As may be seen by observing the tank circuit signal 604 in FIG. 8 and FIG. 9, a shape of the tank circuit signal 604 is different in the no load scenario (FIG. 8) from a shape of the tank circuit signal 604 in the full load scenario (FIG. 9).

Figure 10:
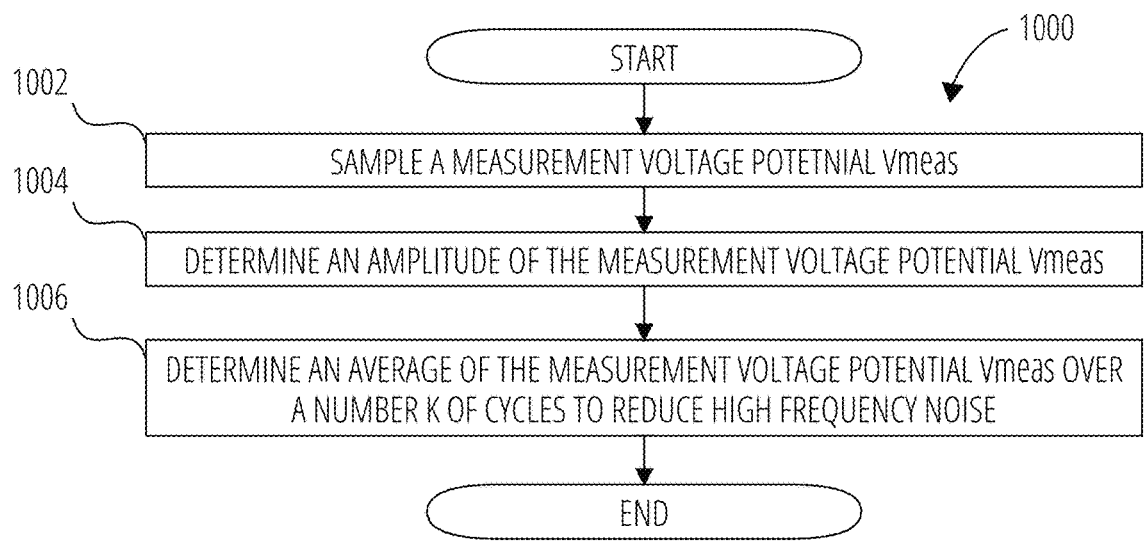
FIG. 10 is a flowchart illustrating an interrupt service method (ISM), according to various examples disclosed herein.

FIG. 10 is a flowchart illustrating an interrupt service method 1000 (ISM 1000), according to various examples disclosed herein. The ISM 1000 may be performed to collect samples of measurement voltage potential (e.g., corresponding to the tank circuit signal 214 of FIG. 2, or the power filter signal 706 of FIG. 7, without limitation). At operation 1002 the ISM 1000 includes sampling the measurement voltage potential Vmeas (e.g., the measurement voltage potential 320 of FIG. 3, the measurement voltage potential 704 of FIG. 7, without limitation). At operation 1004 the ISM 1000 includes determining an amplitude of the measurement voltage potential Vmeas. At operation 1006 the ISM 1000 includes determining an average of the measurement voltage potential Vmeas over a number K (e.g., where K>2, without limitation) of cycles (e.g., at an end of ADC sampling, without limitation) to reduce (e.g., eliminate, without limitation) high frequency noise. Responsive to operation 1006 an average of four samples may be available in a buffer.

Figure 11:
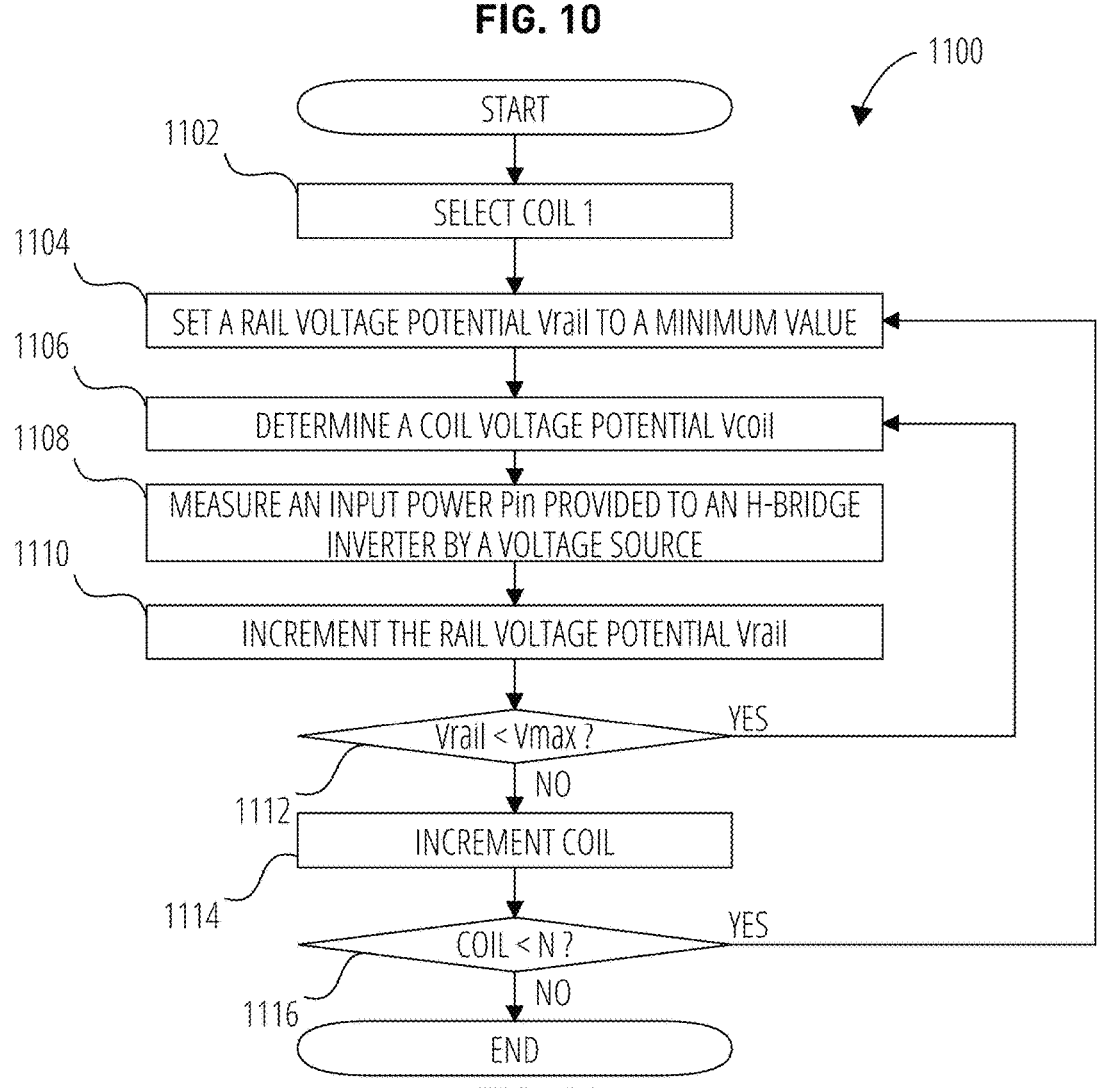
FIG. 11 is a flowchart illustrating a calibration operation for calibrating a wireless power transmitter, according to various examples.

FIG. 11 is a flowchart illustrating a calibration operation 1100 for calibrating a wireless power transmitter, according to various examples. Each transmit coil (e.g., the transmit coils L1, L2, . . . , LN of FIG. 2 and FIG. 6, without limitation) is subjected to a control variable (e.g., a rail voltage potential Vrail, which may be an input voltage potential Vin provided by the voltage source 212 of FIG. 3 and FIG. 7, without limitation) from minimum to maximum levels in steps. In examples where no power converter is provided between the voltage source (e.g., the voltage source 212) and the H-bridge inverter (e.g., the H-bridge inverter 202), Vrail may be Vin. In examples where a power converter (e.g., a buck or a buck-boost converter) is provided between, the rail voltage potential is the voltage potential provided to the H-bridge inverter by the power converter. At each step the input power and the transmit coil voltage potential (e.g., a voltage potential of the tank circuit signal 214 of FIG. 2, of the tank circuit signal 604 of FIG. 6) are tabulated. This is repeated for all the transmit coils in the system.

For example, at operation 1102 the calibration operation 1100 includes selecting coil number 1 (e.g., transmit coil L1 by closing switch 1 S1 (FIG. 2, FIG. 6) associated with coil 1 L1, without limitation). At operation 1104 the calibration operation 1100 includes setting a rail voltage potential Vrail to a minimum value. At operation 1106 the calibration operation 1100 includes determining a coil voltage potential Vcoil. At operation 1108 the calibration operation 1100 includes measuring an input power Pin (e.g., using the input power resistor 344 and the input power input terminal 342 of FIG. 3 and FIG. 7, without limitation) provided to the H-bridge inverter 202 (FIG. 2, FIG. 3, FIG. 6, and FIG. 7) by the voltage source 212 (FIG. 2, FIG. 3, FIG. 6, and FIG. 7). At operation 1110 the calibration operation 1100 includes incrementing the rail voltage potential Vrail, by a predetermined step value.

At decision 1112 the calibration operation 1100 includes determining whether the rail voltage potential Vrail is less than a maximum voltage potential Vmax for the rail voltage potential Vrail. Responsive to a determination that the rail voltage potential Vrail is less than the maximum voltage potential Vmax the calibration operation 1100 includes returning to operation 1106. Responsive to a determination that the rail voltage potential Vrail is not less than the maximum voltage potential Vmax, at operation 1114 the calibration operation 1100 includes incrementing the coil number.

At decision 1116 the calibration operation 1100 includes determining whether the coil number is less than a total number N of the transmit coils. Responsive to a determination that the coil number is less than the total number N of transmit coils, the calibration operation 1100 may include returning to operation 1104. Responsive to a determination that the coil number is not less than the total number N of transmit coils, the calibration operation 1100 may include ending the calibration operation 1100.

The calibration operation 1100 of calibrating the wireless power transmitter may, in some examples, be performed at a start of a product life of the wireless power transmitter (e.g., a per unit product life, without limitation). The calibrated data may be used to estimate power lost in the wireless power transmitter.

Figure 12:
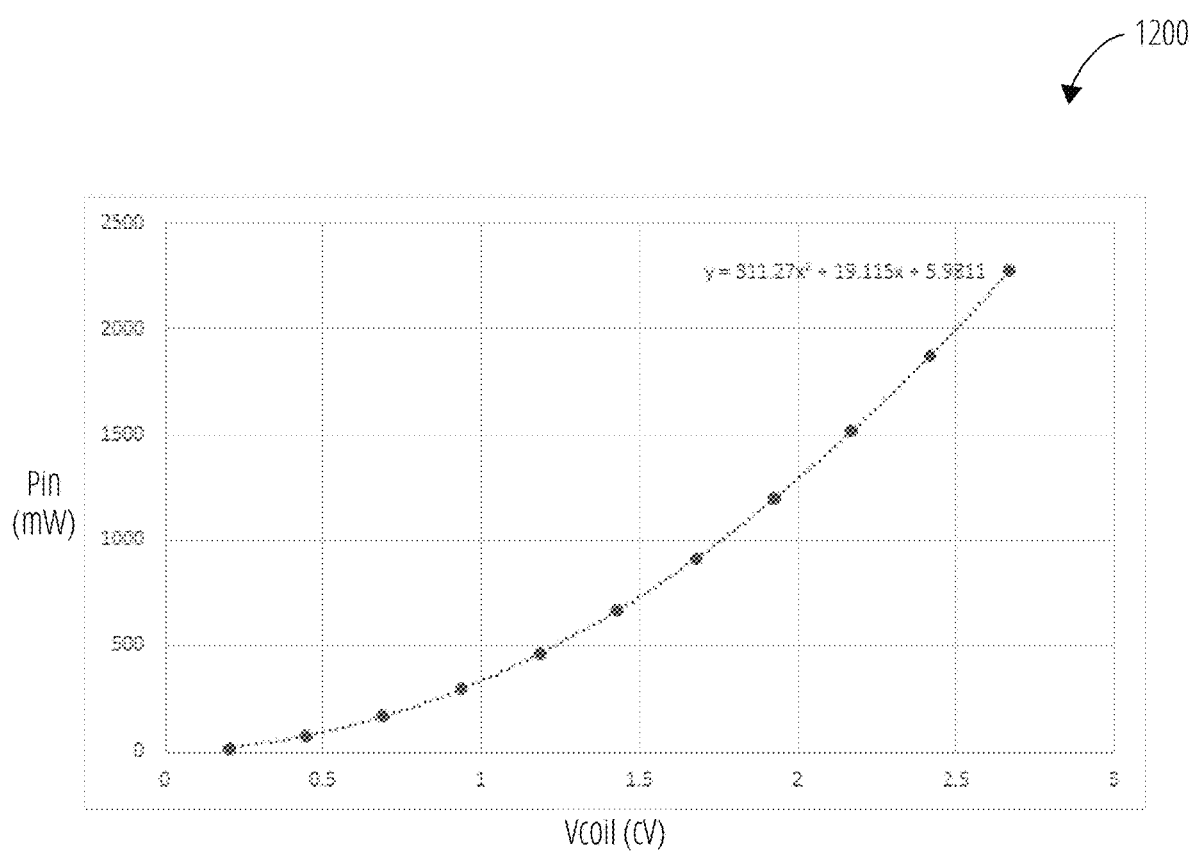
FIG. 12 is a calibration plot according to various examples.

FIG. 12 is a calibration plot 1200 according to various examples. The calibration plot 1200 is a plot of an input power Pin (in mW, vertical axis) as a function of a coil voltage potential Vcoil (in centi-Volts (cV), horizontal axis). Since there is no receive coil in proximity, hence no load, Pin represents the transmitter power loss, Ptl. FIG. 12 shows that the calibrated data from the calibration operation 1100 of FIG. 11 may be converted into a second order polynomial equation for the transmitter power loss Ptl, described below. This may be performed using a microcontroller, or even using a software program that has mathematical computation capabilities run by a processor of a computing platform. The second order polynomial equation may be in the format $$Ptl = a*Vcoil^2 + b*Vcoil + c,$$

where a, b, and c are coefficients, Ptl is the power lost in the transmitter, optionally in milli-Watts (mW) and Vcoil is in centi-Volts (cV).

Figure 13:
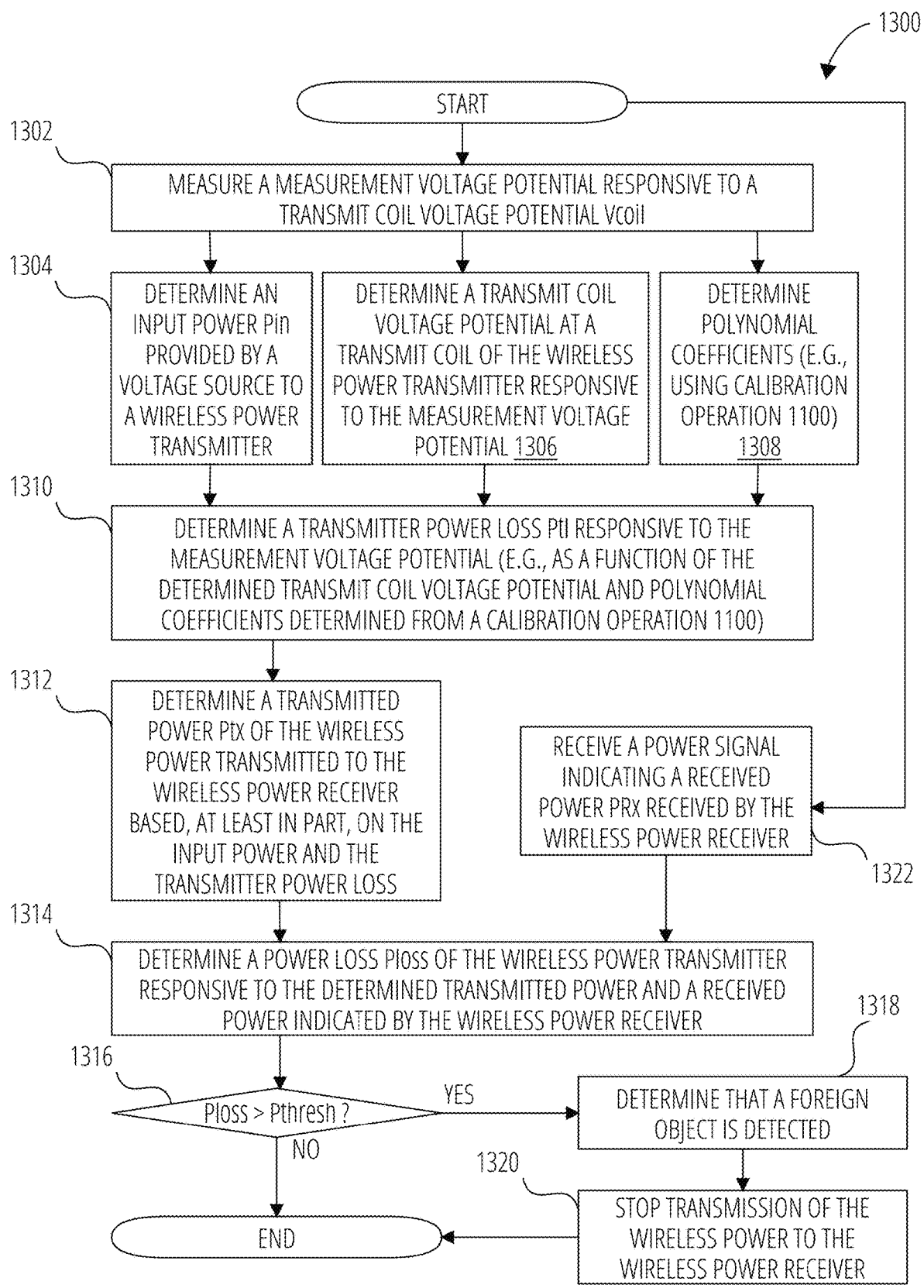
FIG. 13 is a flowchart illustrating a method of detecting a foreign object, according to various examples.

FIG. 13 is a flowchart illustrating a method 1300 of detecting a foreign object, according to various examples. The method 1300 may be performed during transmission of power to a wireless power receiver (e.g., periodically) to detect a foreign object. At operation 1302 the method 1300 includes measuring a measurement voltage potential responsive to a transmit coil voltage potential Vcoil. At operation 1304 the method 1300 includes determining an input power Pin provided by a voltage source to a wireless power transmitter (e.g., using the input power resistor 344 and the input power input terminal 342 of FIG. 3 and FIG. 7, without limitation). In some examples the transmit coil voltage potential Vcoil and the input power Pin may be taken every PWM period (e.g., of the control signals 216 of FIG. 2, FIG. 3, FIG. 6, and FIG. 7, the control signal 402 of FIG. 4 and FIG. 5, the control signal 802 of FIG. 8 and FIG. 9, without limitation).

At operation 1306, which may be in parallel with operation 1304, the method 1300 includes determining a transmit coil voltage potential at a transmit coil of the wireless power transmitter responsive to the measurement voltage potential. The measurement voltage potential may be proportional to the transmit coil voltage potential. Accordingly, the transmit coil voltage potential may be determined responsive to the measurement voltage potential (e.g., by multiplying the measurement voltage potential by a known integer value). At operation 1308, which may be in parallel with operation 1304, the method 1300 includes determining polynomial coefficients (e.g., using calibration operation 1100 of FIG. 11).

At operation 1310 the method 1300 includes determining a transmitter power loss Ptl responsive to the measurement voltage potential (e.g., as a function of the determined transmit coil voltage potential and polynomial coefficients determined at operation 1308, without limitation). The transmitter power loss Ptl may be computed at a predetermined instant (e.g., every 1 ms, without limitation) in synchronization with the receiver determining a received power. At operation 1312 the method 1300 includes determining a transmitted power Ptx that is sent to the wireless power receiver based, at least in part, on the input power Pin and the transmitter power loss Ptl. By way of non-limiting example the transmitted power Ptx may be computed as $$Ptx = Pin - Ptl.$$

The receiver may transmit (e.g., taken at substantially the same time as operation 1302 and operation 1304, without limitation) a received power signal (e.g., the received power signal 338 of FIG. 3, without limitation) indicating a received power Prx at its receive coil (e.g., receive coil 110 of FIG. 1, the receive coil 316 of FIG. 3, without limitation). At operation 1322 the method 1300 includes receiving the power signal indicating the received power PRx received by the wireless power receiver.

At operation 1314 the method 1300 includes determining a power loss Ploss of the wireless power transmitter responsive to the determined transmitted power and the received power indicated by the wireless power receiver. By way of non-limiting example, the power loss Ploss may be computed as $$Ploss = Ptx - Prx$$

At decision 1316 the method 1300 includes comparing the power loss Ploss to a predetermined threshold Pthresh. Responsive to a determination that the power loss Ploss is greater than the predetermined threshold Pthresh, at operation 1318 the method 1300 includes determining that a foreign object is detected (e.g., between a transmit coil of the wireless power transmitter and a receive coil of the wireless power receiver, without limitation). A determination that the power loss Ploss is greater than the predetermined threshold Pthresh may be associated with a foreign object consuming some of the transmit power Ptx. At operation block 1320 the method 1300 includes stopping transmission of the wireless power to the wireless power receiver, at which point the method 1300 may end.

Responsive to a determination that the power loss Ploss is not greater than the predetermined power threshold value Pthresh, the method 1300 may end. A determination that the power loss Ploss is not greater than the predetermined power threshold value Pthresh may be associated with the transmit power Ptx being received by the wireless power receiver.

Figure 14:
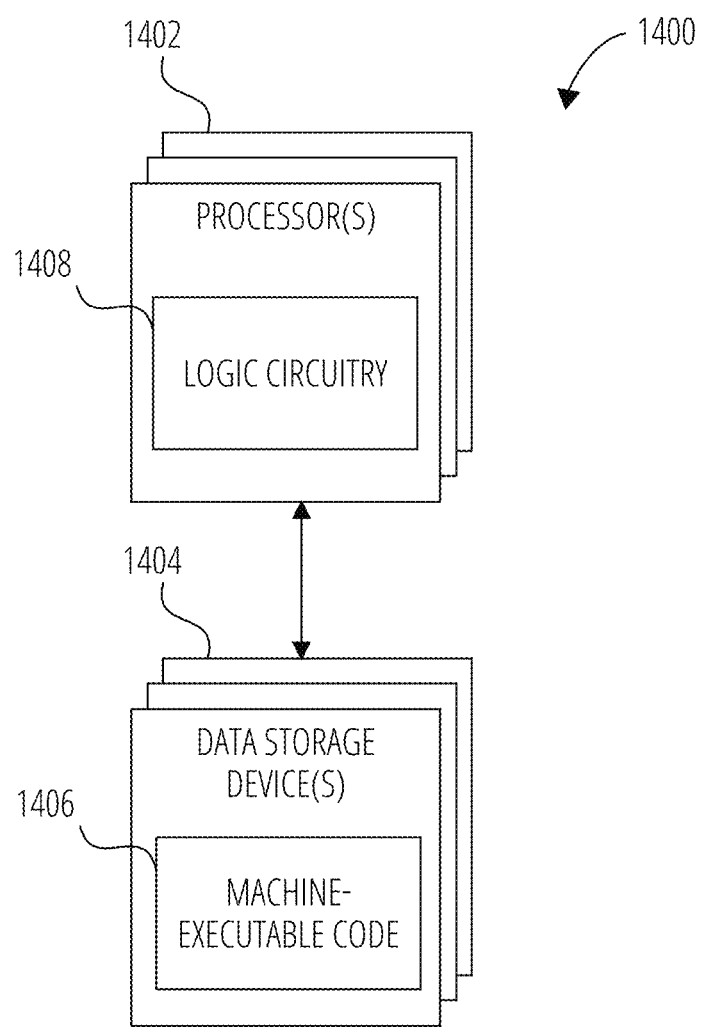
FIG. 14 is a block diagram of circuitry that, in some examples, may be used to implement various functions, operations, acts, processes, or methods disclosed herein.

It will be appreciated by those of ordinary skill in the art that functional elements of examples disclosed herein (e.g., functions, operations, acts, processes, or methods, without limitation) may be implemented in any suitable hardware, software, firmware, or combinations thereof. FIG. 14 illustrates non-limiting examples of implementations of functional elements disclosed herein. In some examples, some or all portions of the functional elements disclosed herein may be performed by hardware specially designed for carrying out the functional elements.

FIG. 14 is a block diagram of circuitry 1400 that, in some examples, may be used to implement various functions, operations, acts, processes, or methods disclosed herein. The circuitry 1400 includes one or more processors 1402 (sometimes referred to herein as "processors 1402") operably coupled to one or more data storage devices (sometimes referred to herein as "storage 1404"). The storage 1404 includes machine-executable code 1406 stored thereon and the processors 1402 include logic circuitry 1408. The machine-executable code 1406 includes information describing functional elements that may be implemented by (e.g., performed by, without limitation) the logic circuitry 1408. The logic circuitry 1408 is adapted to implement (e.g., perform, without limitation) the functional elements described by the machine-executable code 1406. The circuitry 1400, when executing the functional elements described by the machine-executable code 1406, should be considered as special purpose hardware designed for carrying out functional elements disclosed herein. In some examples the processors 1402 may perform the functional elements described by the machine-executable code 1406 sequentially, concurrently (e.g., on one or more different hardware platforms, without limitation), or in one or more parallel process streams.

When implemented by logic circuitry 1408 of the processors 1402, the machine-executable code 1406 adapts the processors 1402 to perform operations of examples disclosed herein. For example, the machine-executable code 1406 may adapt the processors 1402 to perform at least a portion or a totality of the ISM 1000 of FIG. 10, the calibration operation 1100 of FIG. 11, or the method 1300 of FIG. 13. As another example, the machine-executable code 1406 may adapt the processors 1402 to perform at least a portion or a totality of the operations discussed for the controller 318 of FIG. 3 and FIG. 7. As a specific, non-limiting example, the machine-executable code 1406 may adapt the processors 1402 to detect the presence of a foreign object during transmission of wireless power to a wireless power receiver according to examples disclosed herein. As another specific, non-limiting example, the machine-executable code 1406 may adapt the processors 1402 to perform calibration operations according to examples disclosed herein.

The processors 1402 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes functional elements corresponding to the machine-executable code 1406 (e.g., software code, firmware code, hardware descriptions, without limitation) related to examples of the present disclosure. It is noted that a general-purpose processor (may also be referred to herein as a host processor or simply a host) may be a microprocessor, but in the alternative, the processors 1402 may include any conventional processor, controller, microcontroller, or state machine. The processors 1402 may also be implemented as a combination of computing devices, such as a combination of a DSP and a microprocessor, a plurality of microprocessors, one or more microprocessors in conjunction with a DSP core, or any other such configuration.

In some examples the storage 1404 includes volatile data storage (e.g., random-access memory (RAM), without limitation), non-volatile data storage (e.g., Flash memory, a hard disc drive, a solid state drive, erasable programmable read-only memory (EPROM), without limitation). In some examples the processors 1402 and the storage 1404 may be implemented into a single device (e.g., a semiconductor device product, a system on chip (SOC), without limitation). In some examples the processors 1402 and the storage 1404 may be implemented into separate devices.

In some examples the machine-executable code 1406 may include computer-readable instructions (e.g., software code, firmware code, without limitation). By way of non-limiting example, the computer-readable instructions may be stored by the storage 1404, accessed directly by the processors 1402, and executed by the processors 1402 using at least the logic circuitry 1408. Also by way of non-limiting example, the computer-readable instructions may be stored on the storage 1404, transferred to a memory device (not shown) for execution, and executed by the processors 1402 using at least the logic circuitry 1408. Accordingly, in some examples the logic circuitry 1408 includes electrically configurable logic circuitry 1408.

In some examples the machine-executable code 1406 may describe hardware (e.g., circuitry, without limitation) to be implemented in the logic circuitry 1408 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™ SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 1408 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine-executable code 1406 may include an HDL, an RTL, a GL description, a mask level description, other hardware description, or any combination thereof.

In examples where the machine-executable code 1406 includes a hardware description (at any level of abstraction), a system (not shown, but including the storage 1404) may implement the hardware description described by the machine-executable code 1406. By way of non-limiting example, the processors 1402 may include a programmable logic device (e.g., an FPGA or a PLC, without limitation) and the logic circuitry 1408 may be electrically controlled to implement circuitry corresponding to the hardware description into the logic circuitry 1408. Also by way of non-limiting example, the logic circuitry 1408 may include hard-wired logic manufactured by a manufacturing system (not shown, but including the storage 1404) according to the hardware description of the machine-executable code 1406.

Regardless of whether the machine-executable code 1406 includes computer-readable instructions or a hardware description, the logic circuitry 1408 is adapted to perform the functional elements described by the machine-executable code 1406 when implementing the functional elements of the machine-executable code 1406. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations to perform the actions of the module or component or software objects or software routines that may be stored on or executed by general purpose hardware (e.g., computer-readable media, processing devices, without limitation) of the computing system. In some examples, the different components, modules, engines, and services described in the present disclosure may be implemented as objects or processes that execute on the computing system (e.g., as separate threads, without limitation). While some of the system and methods described in the present disclosure are generally described as being implemented in software (stored on or executed by general purpose hardware), specific hardware implementations or a combination of software and specific hardware implementations are also possible and contemplated.

EXAMPLES

A non-exhaustive, non-limiting list of examples follows. Not each of the examples listed below is explicitly and individually indicated as being combinable with all others of the examples listed below and examples discussed above. It is intended, however, that these examples are combinable with all other examples unless it would be apparent to one of ordinary skill in the art that the examples are not combinable.

Example 1: An apparatus, comprising: an input terminal to receive a measurement voltage potential responsive to a transmit coil voltage potential; and a processing core to: determine an input power provided by a voltage source to a wireless power transmitter; determine a transmitter power loss responsive to the measurement voltage potential; determine a transmitted power of wireless power transmitted to a wireless power receiver based, at least in part, on the determined input power and the determined transmitter power loss; determine a power loss responsive to the determined transmitted power and a received power indicated by the wireless power receiver; and determine that a foreign object is detected responsive to a determination that determined power loss is greater than predetermined threshold power.

Example 2: The controller of Example 1, wherein the processing core to stop transmission of wireless power to the wireless power receiver responsive to a determination of foreign object detected.

Example 3: The controller according to any one of Examples 1 and 2, wherein the processing core to: determine the transmit coil voltage potential at a transmit coil of the wireless power transmitter responsive to the measurement voltage potential; and determine the transmitter power loss as a function of the determined transmit coil voltage potential and polynomial coefficients determined from a calibration operation.

Example 4: The controller of Example 3, wherein the polynomial coefficients are second order polynomial coefficients.

Example 5: The controller according to any one of Examples 3 and 4, wherein the calibration operation includes, for a plurality of transmit coils: selecting a respective transmit coil of the plurality of transmit coils; incrementing a rail voltage potential of the wireless power transmitter from a first rail voltage potential to a last rail voltage potential; and determining the transmit coil voltage potential and the input power for respective increments of the rail voltage potential.

Example 6: The controller of Example 5, wherein the processing core is to determine the polynomial coefficients responsive to values of the transmit coil voltage potential and the input power for the respective transmit coil of the plurality of transmit coils.

Example 7: The controller according to any one of Examples 1-6, wherein the processing core is to determine the transmit coil voltage potential based, at least in part, on an average amplitude of the measurement voltage potential over a predetermined number of cycles.

Example 8: An apparatus, comprising: a tank circuit including a plurality of transmit coils electrically selectable responsive to coil select signals; a gain block electrically connected to the tank circuit; and a controller to: sample a measurement voltage potential provided by the gain block during transmission of wireless power to a wireless power receiver; determine a power loss based, at least in part, on samples of the measurement voltage potential, a received power indicated by the wireless power receiver, and polynomial coefficients from a calibration operation; and determine that a foreign object is detected responsive to a determination that the determined power loss is greater than a predetermined threshold.

Example 9: The apparatus of Example 8, wherein the gain block is electrically connected to the tank circuit at a junction between the plurality of transmit coils and a transmit capacitor of the tank circuit.

Example 10: The apparatus of Example 8, comprising a power filter electrically connected to the tank circuit.

Example 11: The apparatus of Example 10, wherein the gain block is electrically connected to one or more points of an electrical connection between the power filter and the tank circuit.

Example 12: The apparatus according to any one of Examples 10 and 11, wherein the power filter is a second-order filter including a first filter inductor, a second filter inductor, and a filter capacitor electrically connected between the first filter inductor to the second filter inductor.

Example 13: The apparatus according to any one of Examples 10-12, wherein the power filter is to provide a substantially sinusoidal signal to the tank circuit responsive to a square wave signal provided to the power filter.

Example 14: A method of detecting an object, the method comprising: determining an input power provided by a voltage source to a wireless power transmitter; determining a transmitter power loss responsive to a measurement voltage potential; determining a transmitted power of wireless power transmitted to a wireless power receiver based, at least in part, on the input power and the transmitter power loss; determining a power loss responsive to the determined transmitted power and a received power indicated by the wireless power receiver; and determining that a foreign object is detected responsive to a determination that determined power loss is greater than predetermined threshold.

Example 15: The method of Example 14, comprising determining a transmit coil voltage potential at a transmit coil of the wireless power transmitter responsive to the measurement voltage potential.

Example 16: The method of Example 15, wherein determining the transmitted power loss comprises determining the transmitted power loss as a function of the determined transmit coil voltage potential and coefficients determined from a calibration operation.

Example 17: The method according to any one of Examples 14-16, comprising: sampling the measurement voltage potential; determining an amplitude of the measurement voltage potential; and determining an average of the measurement voltage potential over a number of cycles to reduce high frequency noise.

Example 18: The method according to any one of Examples 14-17, wherein determining the transmitted power loss comprises determining the transmitted power loss as a function of a determined transmit coil voltage potential and coefficients determined from a calibration operation.

Example 19: The method of Example 18, wherein the calibration operation comprises, for respective transmit coils of a plurality of transmit coils: setting a rail voltage potential to a minimum value; measuring a transmit coil voltage potential; measuring the input power provided to an H-bridge inverter by the voltage source; incrementing the rail voltage potential; and repeating the measuring the transmit coil voltage potential, the measuring the input power, and the incrementing the rail voltage potential until the rail voltage potential is not less than a maximum voltage potential for the rail voltage potential.

Example 20: The method according to any one of Examples 18 and 19, wherein the coefficients are determined by converting calibrated data from the calibration operation into a second order polynomial equation for the transmitter power loss as a second order polynomial function of the transmit coil voltage potential.

CONCLUSION

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" or "an" should be interpreted to mean "at least one" or "one or more," without limitation); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations, without limitation). Furthermore, in those instances where a convention analogous to "at least one of A, B, and C, without limitation" or "one or more of A, B, and C, without limitation" is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus, comprising:
    an input terminal to receive a measurement voltage potential at a selected transmit coil of a plurality of transmit coils of a wireless power transmitter; and
    a processing core to:
        determine a transmit coil voltage potential at the selected transmit coil responsive to the measurement voltage potential;
        determine an input power provided by a voltage source to the wireless power transmitter;
        determine a transmitter power loss as a function of the transmit coil voltage potential and polynomial coefficients determined from a calibration operation;
        determine a transmitted power of wireless power transmitted to a wireless power receiver based, at least in part, on the determined input power and the determined transmitter power loss;
        determine a power loss responsive to the determined transmitted power and a received power indicated by the wireless power receiver; and
        determine that a foreign object is detected responsive to a determination that determined power loss is greater than predetermined threshold power,
        in the calibration operation, for respective transmit coils of the plurality of transmit coils:
            select a respective transmit coil of the plurality of transmit coils;
            increment a rail voltage potential of the wireless power transmitter from a first rail voltage potential to a last rail voltage potential; and
            determine the transmit coil voltage potential and the input power for respective increments of the rail voltage potential.

2. The apparatus of claim 1, wherein the processing core is to stop transmission of wireless power to the wireless power receiver responsive to a determination of foreign object detected.

3. The apparatus of claim 1, wherein the processing core is to:
    sample the measurement voltage potential;
    determine an amplitude of the measurement voltage potential; and
    determine an average of the measurement voltage potential over a number of cycles to determine the transmit coil voltage potential.

4. The apparatus of claim 1, wherein the polynomial coefficients are second order polynomial coefficients.

5. The apparatus of claim 1, wherein the processing core is to determine the polynomial coefficients responsive to values of the transmit coil voltage potential and the input power for the respective transmit coil of the plurality of transmit coils.

6. The apparatus of claim 1, wherein the processing core is to determine the transmit coil voltage potential based, at least in part, on an average amplitude of the measurement voltage potential over a predetermined number of cycles.

7. An apparatus, comprising:
    a tank circuit including a plurality of transmit coils electrically selectable responsive to coil select signals;
    a power filter electrically connected to the tank circuit, the power filter to provide a substantially sinusoidal signal to the tank circuit responsive to a square wave signal provided to the power filter;
    a gain block electrically connected to the tank circuit; and
    a controller to:
        sample a measurement voltage potential provided by the gain block during transmission of wireless power to a wireless power receiver;
        determine a power loss based, at least in part, on samples of the measurement voltage potential, a received power indicated by the wireless power receiver, and polynomial coefficients from a calibration operation; and determine that a foreign object is detected responsive to a determination that the determined power loss is greater than a predetermined threshold.

8. The apparatus of claim 7, wherein the gain block is electrically connected to the tank circuit at a junction between the plurality of transmit coils and a transmit capacitor of the tank circuit.

9. The apparatus of claim 7, comprising an H-bridge inverter electrically connected to the power filter, wherein the controller is to:

provide control signals to the H-bridge inverter to generate the square wave signal.

10. The apparatus of claim 7, wherein the gain block is electrically connected to one or more points of an electrical connection between the power filter and the tank circuit.

11. The apparatus of claim 7, wherein the power filter is a second-order filter including a first filter inductor, a second filter inductor, and a filter capacitor electrically connected between the first filter inductor to the second filter inductor.

12. The apparatus of claim 7, wherein in the calibration operation, the controller is to:

select a respective transmit coil of the plurality of transmit coils;

increment a rail voltage potential from a first rail voltage potential to a last rail voltage potential; and determine the transmit coil voltage potential and input power for respective increments of the rail voltage potential.

13. A method of detecting an object, the method comprising:

operating a wireless power transmitter to transmit wireless power to a wireless power receiver using a selected transmit coil of a plurality of transmit coils;

determining an input power provided by a voltage source to the wireless power transmitter;

determining a transmitter power loss as a function of a determined transmit coil voltage potential at the selected transmit coil and polynomial coefficients determined from a calibration operation;

determining a transmitted power of the wireless power transmitted to the wireless power receiver based, at least in part, on the input power and the transmitter power loss;

determining a power loss responsive to the determined transmitted power and a received power indicated by the wireless power receiver; and determining that a foreign object is detected responsive to a determination that determined power loss is greater than predetermined threshold, wherein the polynomial coefficients are determined for respective transmit coils of the plurality of transmit coils responsive to:

selecting a respective transmit coil of the plurality of transmit coils;

incrementing a rail voltage potential of the wireless power transmitter from a first rail voltage potential to a last rail voltage potential;

determining the transmit coil voltage potential and the input power for respective increments of the rail voltage potential; and determining the polynomial coefficients responsive to values of the transmit coil voltage potential and the input power for the respective transmit coil of the plurality of transmit coils.

14. The method of claim 13, comprising determining the transmit coil voltage potential responsive to a measurement voltage potential at the selected transmit coil.

15. The method of claim 14, comprising:

sampling the measurement voltage potential;

determining an amplitude of the measurement voltage potential; and determining an average of the measurement voltage potential over a number of cycles to reduce high frequency noise.

16. The method of claim 13, wherein the polynomial coefficients are determined by converting calibrated data from the calibration operation into a second order polynomial equation for the transmitter power loss as a second order polynomial function of the transmit coil voltage potential.

* * * * *